United States Patent
Dupont et al.

(10) Patent No.: US 9,243,960 B2
(45) Date of Patent: Jan. 26, 2016

(54) SYSTEM AND METHOD FOR DETECTING INFRARED RADIATION

(71) Applicant: ULIS, Veurey Voroize (FR)

(72) Inventors: Benoît Dupont, Brussels (BE); Michel Vilain, Saint-Georges de Commiers (FR)

(73) Assignee: ULIS, Veurey Voroize (FR)

( * ) Notice: Subject to any disclaimer, the term of this patent is extended or adjusted under 35 U.S.C. 154(b) by 0 days.

(21) Appl. No.: 14/167,160

(22) Filed: Jan. 29, 2014

(65) Prior Publication Data

US 2014/0183364 A1 Jul. 3, 2014

Related U.S. Application Data

(63) Continuation-in-part of application No. 13/277,661, filed on Oct. 20, 2011, now Pat. No. 8,674,307, which is a continuation of application No. PCT/FR2010/050746, filed on Apr. 19, 2010.

(30) Foreign Application Priority Data

Apr. 30, 2009 (FR) ...................................... 09 52919

(51) Int. Cl.
| | |
|---|---|
| *G01J 5/02* | (2006.01) |
| *G01J 5/22* | (2006.01) |
| *G01J 5/24* | (2006.01) |
| *H04N 5/33* | (2006.01) |
| *H04N 5/365* | (2011.01) |

(52) U.S. Cl.
CPC .... *G01J 5/22* (2013.01); *G01J 5/24* (2013.01); *H04N 5/33* (2013.01); *H04N 5/3651* (2013.01)

(58) Field of Classification Search
CPC ................ G01J 5/22; G01J 5/24; H04N 5/33; H04N 5/3651
USPC ......................................................... 250/340
See application file for complete search history.

(56) References Cited

U.S. PATENT DOCUMENTS

| | | | |
|---|---|---|---|
| 5,756,999 A | 5/1998 | Parrish et al. | |
| 8,674,307 B2 * | 3/2014 | Dupont et al. ................ | 250/349 |
| 2002/0022938 A1 | 2/2002 | Butler | |
| 2006/0231760 A1 | 10/2006 | Lee et al. | |

FOREIGN PATENT DOCUMENTS

WO 98/47102 A2 10/1998

OTHER PUBLICATIONS

Eric Mottin, et al., "*Uncooled Amorphous Silicon Technology Enhancement for 25-µm Pixel Pitch Achievement*," Infrared Technology and Applications XXVIII, Proceedings SPIE, vol. 4820, 200 (2003) *Abstract*.

(Continued)

*Primary Examiner* — David Porta
*Assistant Examiner* — Edwin Gunberg
(74) *Attorney, Agent, or Firm* — Burr & Brown, PLLC

(57) ABSTRACT

A method for detecting infrared radiation by using an array of bolometers. The following steps are used to read a bolometer of the array of bolometers: biasing the bolometer at a predetermined voltage in order to make current flow through the bolometer; subtracting a common-mode current from the current that flows through the bolometers; and producing a voltage by integrating the difference between the current that flows through the bolometers and the common-mode current.

17 Claims, 8 Drawing Sheets

(56) References Cited

OTHER PUBLICATIONS

Sherif Sedky et al., "*Thermally Insulated Structures for IR Bolometers, Made of Polyetystalline Silicon Germanium Alloys,*" 1997 International Conference on Solid-State Sensors and Actuators (Jun. 1997), pp. 237-240.

M.A. Dem'yanenko et al., "*Using Bias Pulses to Equalize the Signals in Microbolometer Detector Arrays,*" Journal of Optical Technology, vol. 75, No. 2 (Feb. 2008), pp. 114-119.

\* cited by examiner

SYSTEM AND METHOD FOR DETECTING INFRARED RADIATION

CROSS-REFERENCE TO RELATED APPLICATIONS

This application is a continuation-in-part application of U.S. patent application Ser. No. 13/277,661, filed Oct. 20, 2011, which is a continuation of PCT/FR2010/050746, filed Apr. 19, 2010, the entireties of which are incorporated herein by reference, and claims the benefit under 35 USC §119(a)-(d) from French Patent Application No. 09.52919, filed Apr. 30, 2009.

FIELD OF THE INVENTION

The present invention relates to the field of infrared imaging and pyrometry using bolometers. More especially, the invention relates to the field of image sensors for bolometric detection, regardless of the detection band and the type of bolometric materials used.

BACKGROUND OF THE INVENTION

Detectors designed for infrared imaging are conventionally produced as a one or two-dimensional array of elementary detectors, or bolometers, said bolometers taking the form of membranes suspended above a substrate which is generally made of silicon, by means of support arms that have a high thermal resistance.

The substrate usually incorporates means of sequentially addressing the elementary detectors and means of electrically exciting and pre-processing the electrical signals generated by these bolometers. This substrate and the integrated means are commonly referred to as the "readout circuit".

In order to obtain a scene infrared image using this detector, the scene is projected through suitable optics onto the array of bolometers and clocked electrical stimuli are applied via the readout circuit to each of the bolometers or to each row of such bolometers in order to obtain an electrical signal that constitutes an image of the temperature reached by each of said elementary detectors. This signal is then processed to a greater or lesser extent by the readout circuit and then, if applicable, by an electronic device outside the package in order to generate a thermal image of the observed scene.

This type of detector has numerous advantages in terms of its manufacturing cost and implementation but also has drawbacks that limit the performance of systems that use such detectors. In particular, there are problems with regard to the uniformity of the image obtained. In fact, when exposed to a uniform scene, not all the bolometers respond in exactly the same way and this results in fixed spatial noise in the image thus obtained.

This variability has several sources. In particular, technological variability of the resistance of the bolometers causes, among other defects, offset variation and gain variation in the image, i.e. in the case of offset, spatial variation in the output levels of bolometers exposed to a uniform image and, in the case of gain, variability of the absolute variation in the output levels of bolometers that are exposed to a uniform temperature variation of a scene.

There are numerous offset correction methods. A first method for correcting offset variation involves using offset correction tables which are prepared after factory calibration operations. However, the stability of these corrections depends on the temperature stability of the focal plane and thus, in non-temperature controlled applications (commonly referred to as "TEC-less"), it is necessary to resort to acquiring and storing gain and offset tables for multiple, so-called calibration temperatures and then using said tables when the detector is operated, for instance by interpolation, in order to ensure continuous digital correction over the entire operational dynamic range, in terms of temperature, of the focal plane of the detector. These tables, obtained using a factory calibration test bench, incur significant costs for manufacturers, especially in terms of the equipment that is installed in the calibration test bench and the time it takes to acquire all the gain and offset tables.

Another method, disclosed for example in Document US 2002/0022938, involves acquiring an image of a uniform reference scene by closing a mechanical shutter. Once this image has been acquired, the shutter is opened and the reference image is stored and then digitally or analogically subtracted from the current images. This method is more widely known as "shutter correction" or "one-point correction". It has the advantage of enabling highly efficient correction at around the ambient temperature of the detector which was used to acquire the reference image and requires little memory and few computing resources.

On the other hand, this method involves using a mechanical shutter—a mechanical device which has a non-negligible cost, is relatively fragile because of the moving parts it contains and consumes energy. What is more, if operating conditions change and, more especially the thermal environment of the detector changes, the images acquired from the scene deteriorate due to the reappearance of offset variation and it is then necessary to acquire a reference image again by closing the mechanical shutter. In fact, the detector is unusable, at least for the time it takes to acquire the reference image.

Another offset correction method which is disclosed, for example, in document WO 98/47102, involves digitally processing a series of consecutive images contained in a rolling time window that includes enough frames to make it possible to extract a continuous component from the time window. The spatial distribution of this continuous component, which is similar to the offset distribution, is then digitally subtracted from the current acquired images.

However, this not only suppresses the actual offset variation itself, it also suppresses all the static information from the scene. There is admittedly no need to use a mechanical shutter but offset correction like this is only really acceptable in cases where the scene is essentially permanently variable or moving. In fact, all details and fixed local contrasts over a duration that is equal to or greater than the duration of the rolling window are processed as non-uniformities and, by virtue of this, are corrected in the same way as fixed spatial noise.

Generally speaking, offset correction methods according to the prior art are only applied once an image has been acquired and therefore correct the effects of offset variation in the image. Nevertheless, although offset variation impacts image quality as such due to the presence of noise that is independent of the scene, it also has effects on the dynamic range of the observable scene that these types of techniques do not correct.

To correct this phenomenon, FIG. 1 shows a basic detection and readout layout of the kind that is conventionally used in bolometric array detectors.

This basic layout comprises:
 a picture element, or pixel, 10, comprising, in particular, an imaging bolometer 12 and components 14 and 16 that are needed in order to implement it;
 an integrating circuit 18 used to read imaging bolometer 12; and a compensation circuit 20 for compensating a common-mode current that flows through imaging bolometer 12 when the latter is read.

Bolometer 12 is subjected to infrared radiation IR originating from a scene and is connected to ground by a first terminal A.

Integrating circuit 18 comprises:

an operational amplifier 22, the non-inverting input (+) of which is kept at a predetermined constant voltage VBUS;

a capacitor 24, having a predetermined capacitance $C_{int}$ and connected between the inverting input (−) of amplifier 22 and the output of the latter; and a reset switch 26 connected in parallel with capacitor 24 and controllable by means of a "Reset" signal.

Picture element 10 also comprises a read switch 16 that can be controlled by means of a "Select" signal and is connected to the inverting input (−) of the operational amplifier and a first MOS injection transistor 14, the gate of which is controlled by a voltage VFID so as to impose a voltage $V_{ac}$ across the terminals of bolometer 12, the source of which is connected to a second terminal B of bolometer 12 and the drain of which is connected to the other terminal of read switch 16.

Compensation circuit 20 used to compensate the common-mode current that flows through imaging bolometer 12 comprises a resistive compensation bolometer 28 made of the same material as imaging bolometer 12. Compensation bolometer 28 is essentially insensitive to radiation originating from the scene, for instance because it has a low thermal resistance relative to the substrate and is, optionally or alternatively, provided with an opaque shield 30.

One of the terminals of compensation bolometer 28 is connected to a predetermined voltage VSK and its other terminal is connected to the source of a second MOS injection transistor 32 of circuit 20. The drain of injection transistor 32 is connected to the inverting input (−) of operational amplifier 22 and its gate is connected to a predetermined voltage GSK.

In order to read bolometer 12, once capacitor 24 has discharged due to zero reset switch 26 closing, imaging and compensation bolometers 12, 28 are biased by the control voltage of biasing transistors 14, 32 and the difference between current $I_{ac}$ that flows through imaging bolometers 12 and current $I_{av}$ that flows through compensation bolometer 28 is integrated by integrating circuit 18 over a predetermined integration duration $T_{int}$. As is known in itself, the use of compensation circuit 20 is justified by the fact that the useful current. i.e. that which is representative of the temperature of the scene, only accounts for a minute portion, generally around 1%, of the total current that flows through imaging bolometer 12, hence the need to eliminate the common-mode current before integration.

The voltage Vout on the output of integrator 18 is then given by the equation:

$$Vout = VBUS + \frac{1}{C_{int}} \int_0^{T\,int} (I_{ac}(t) - I_{av}(t))\,dt \quad (1)$$

Integration by circuit 18 thus makes it possible to apply, through the value of capacitance $C_{int}$, gain to readout of the wanted signal whilst ensuring conversion of the useful current to a voltage that is simpler to manipulate. This way, all the imaging bolometers of the array detector are read in the same way, especially by applying the same bias level.

The layout and operation of the components described above is conventional and is not explained in any greater detail for the sake of brevity. For additional details, the reader is advised to consult, for example, the document entitled "*Uncooled amorphous silicon technology enhancement for 25 µm pixel pitch achievement*" by E. Mottin et al. Infrared Technology and Application XXVIII, SPIE, vol. 4820 (2003).

Assuming, for instance, that the relative spatial variation in the resistance of the imaging bolometers of the detector equals 1%, resulting in, for low bias levels, a 1% variation in currents $I_{ac}$, and that biasing of the compensation bolometers is selected so that current $I_{av}$ equals approximately 90% of current $I_{ac}$, the spatial variation in voltages Vout after all the bolometers have been read is approximately 10%. In conventional detectors, this variation represents around 300 mV of their dynamic output response. If biasing of the imaging bolometers is also increased, for instance by 50%, in order to increase the value of the output levels and hence the sensitivity of the detector, the variation in output voltages Vout also increases by 50% and then reaches 450 mV. Considering that the total dynamic response available is usually limited to 2 or 3 V, a significant portion of this dynamic response is therefore used up by the natural variability of bolometers alone.

Thus, offset variation, simply by existing, uses up a portion of the dynamic output response of a detector. The term "residual dynamic response" or "dynamic scene response" is usually used to denote the difference between the maximum amplitude of voltage Vout when the integrating circuits are not saturated and the maximum amplitude of output voltages Vout when exposed to a uniform scene, i.e. the remaining dynamic response to the wanted signal.

Besides the residual dynamic response being less than the electrical dynamic response of the integrating circuits simply due to the presence of offset variation, this residual dynamic response diminishes as the sensitivity desired by the user increases.

Also, when the imaging bolometers are biased, their temperature rises due to the Joule effect, resulting in increased amplification of variation in the currents that flow through them and hence the output voltages, thus resulting in a reduced residual dynamic response. A similar phenomenon also occurs when the temperature of the focal plane on which the bolometer array is positioned is increased. Because usual bolometric materials have a negative coefficient of thermal resistance, this results in variability of the output levels of the bolometers increasing rapidly, thereby significantly diminishing the residual dynamic response.

It should be noted that offset variation corrections according to the prior art do not deal with this reduction in residual dynamic response in any way and confine themselves to retrospectively correcting the effects of said variability on images that have already been formed.

SUMMARY OF THE INVENTION

The object of the present invention is to propose a method that corrects the effect of offset variability both on formed images and on residual dynamic response.

The object of the invention is method for detecting infrared radiation by using an array of bolometers, the bolometers having electrical resistances that vary in the same direction as a function of the temperature, and the bolometers having respective offsets in resistance $\Delta R_0(i,j)$, this method consisting of the following steps in order to read a bolometer of the array of bolometers:

biasing the bolometer at a predetermined voltage in order to make current flow through the bolometer;

subtracting a common-mode current from the current that flows through the bolometers; and producing a voltage by integrating the difference between the current that flows through the bolometers and the common-mode current, wherein the method comprises determining the offsets in resistance $\Delta R_0(i,j)$ of the bolometers with regard to a common value $R_{min}$, wherein said common value $R_{min}$ is greater or equal to the largest resistances of the bolometers when said direction is an increase or said common value $R_{min}$ is lesser or equal to the smallest resistances of the bolometers when said direction is a decrease, and wherein the method involves, prior to reading a bolometer, individually correcting the resistance of said bolometer by injecting therein an electrical current so as to shift the resistance of said bolometer by the offset in resistance $\Delta R_0(i,j)$ determined for said bolometer, thereby adjusting the resistance of said bolometer to the common value $R_{min}$.

In other words, the circuit that controls the resistance of the bolometers according to the invention individually modifies the value of the resistances of the bolometers so as to reduce this resistance if the resistance of the bolometer diminishes as a function of temperature or increase it if the opposite applies. The resistances of the bolometers are preferably modified in a way that makes them substantially identical. This correction is performed upstream from reading, i.e. before the bolometers are biased and the currents are integrated. This modification of resistances is obtained through the Joule effect by using electrical means in a phase prior to the integration phase without altering the thermal information obtained from the observed scene.

According to particular embodiments of the invention, the device comprises one or more of the following aspects.

The offsets in resistance $\Delta R_0(i,j)$ of the bolometers are determined by:

exposing the array of bolometers to a uniform scene;

determining the corresponding resistances of the bolometers; and subtracting the following from said resistances:

a quantity substantially equal to the smallest of the determined resistances when said direction is a decrease; or subtracting, from said resistances, a quantity substantially equal to the largest of the determined resistances when said direction is an increase.

The current injection in said bolometer consists in:

injecting a predetermined single constant current $I_{ref}$ in said bolometer, said current being the same for all the bolometers;

stopping current injection in said bolometer after an individual duration $\Delta t(i,j)$ depending on the offset in resistance $\Delta R_0(i,j)$ of said bolometer.

The individual duration $\Delta t(i,j)$ equals a value according to the equation:

$$\Delta t(i, j) = \frac{k \cdot TPF^2 \cdot C_{th}}{E_A \cdot (R_{ac}(i, j) \cdot I_{ref})^2} \cdot \Delta R_0(i, j)$$

where $\Delta R_0(i,j)$ is the offset in resistance of said bolometer, k is Boltzmann's constant, TPF is the temperature of the substrate, $C_{th}$ is the heat capacity of the bolometer, $E_A$ is the thermal conduction activation energy of the bolometric material of which the bolometer is made, and $R_{ac}(i,j)$ is the resistance of said bolometer determined after having exposed the array to the uniform scene.

The individual duration $\Delta t(i,j)$ equals a value according to the equation:

$$\Delta t(i,j) = K \cdot R_0(i,j)$$

wherein K is a factor minimizing the span of voltages produced by the reading of the imagining bolometers, and wherein the method consists in determining said factor K being by a try and repeat loop.

The current injection in said bolometer consists in:

applying a predetermined single constant voltage V across the terminals of said bolometer, said voltage being the same for all the bolometers;

stopping current injection in said bolometer after an individual duration $\Delta t(i,j)$ depending on the offset in resistance $\Delta R_0(i,j)$ of said bolometer.

The individual duration $\Delta t(i,j)$ equals a value according to the equation:

$$\Delta t(i, j) = \frac{k \cdot TPF^2 \cdot C_{th}}{E_A \cdot V^2} \cdot \Delta R_0(i, j)$$

where $\Delta R_0(i,j)$ is the offset in resistance of said bolometer, k is Boltzmann's constant, TPF is the temperature of the substrate, $C_{th}$ is the heat capacity of the bolometer, and $E_A$ is the thermal conduction activation energy of the bolometric material of which the bolometer is made.

The individual duration $\Delta t(i,j)$ equals a value according to the equation:

$$\Delta t(i,j) = K \cdot \Delta R_0(i,j)$$

wherein K is a factor minimizing span of voltages produced by the reading of the imagining bolometers, and wherein the method consists in determining said factor K being by a try and repeat loop.

The current injection in said bolometer consists in:

injecting a predetermined single constant current $I_{ref}$ in said bolometer, said current being the same for all the bolometers.

comparing the voltage across the terminals of said bolometer with a predetermined individual voltage that depends on the offset in resistance $\Delta R_0(i,j)$ of said bolometer, and stopping the current injection in said bolometer when the voltage across the terminals of said bolometer equals the predetermined individual voltage.

The current injection in said bolometers consists in:

applying a predetermined single constant voltage V across the terminals of said bolometer, said voltage being the same for all the bolometers;

injecting an individual current into said bolometer during a single period of time $\Delta t$, the individual current having a value that depends on the bolometer's offset in resistance $\Delta R_0(i,j)$, and the single period of time $\Delta t$ being the same for all the bolometers.

The individual current equals a value according the following equation:

$$I_{ref}(i, j) = \left( \frac{k \cdot TPF^2 \cdot C_{th}}{E_A \cdot R_{ac}(i, j) \cdot \Delta t} \cdot \Delta R_0(i, j) \right)^{1/2}$$

where $I_{ref}(i,j)$ is the value of the current, $\Delta R_0(i,j)$ is the offset in resistance of said bolometer, k is Boltzmann's constant, TPF is the temperature of the substrate, $C_{th}$ is the heat capacity of the bolometer. $E_A$ is the thermal conduction activation energy of the bolometric material of which the bolometer is made, and $R_{ac}(i,j)$ the resistance of said bolometer determined after having exposed the array to the uniformed scene.

The method comprises the application of simultaneous individual corrections for a row of bolometers of the array of bolometers, and wherein the current injection into the bolometers of the row is temporarily deferred so as to terminate said current injection substantially simultaneously.

BRIEF DESCRIPTION OF THE DRAWINGS

The invention will be made more readily understandable by the following description which is given merely by way of example and relates to the accompanying drawings in which identical references denote identical or analogous components and in which.

DETAILED DESCRIPTION OF THE INVENTION

Figure 2:
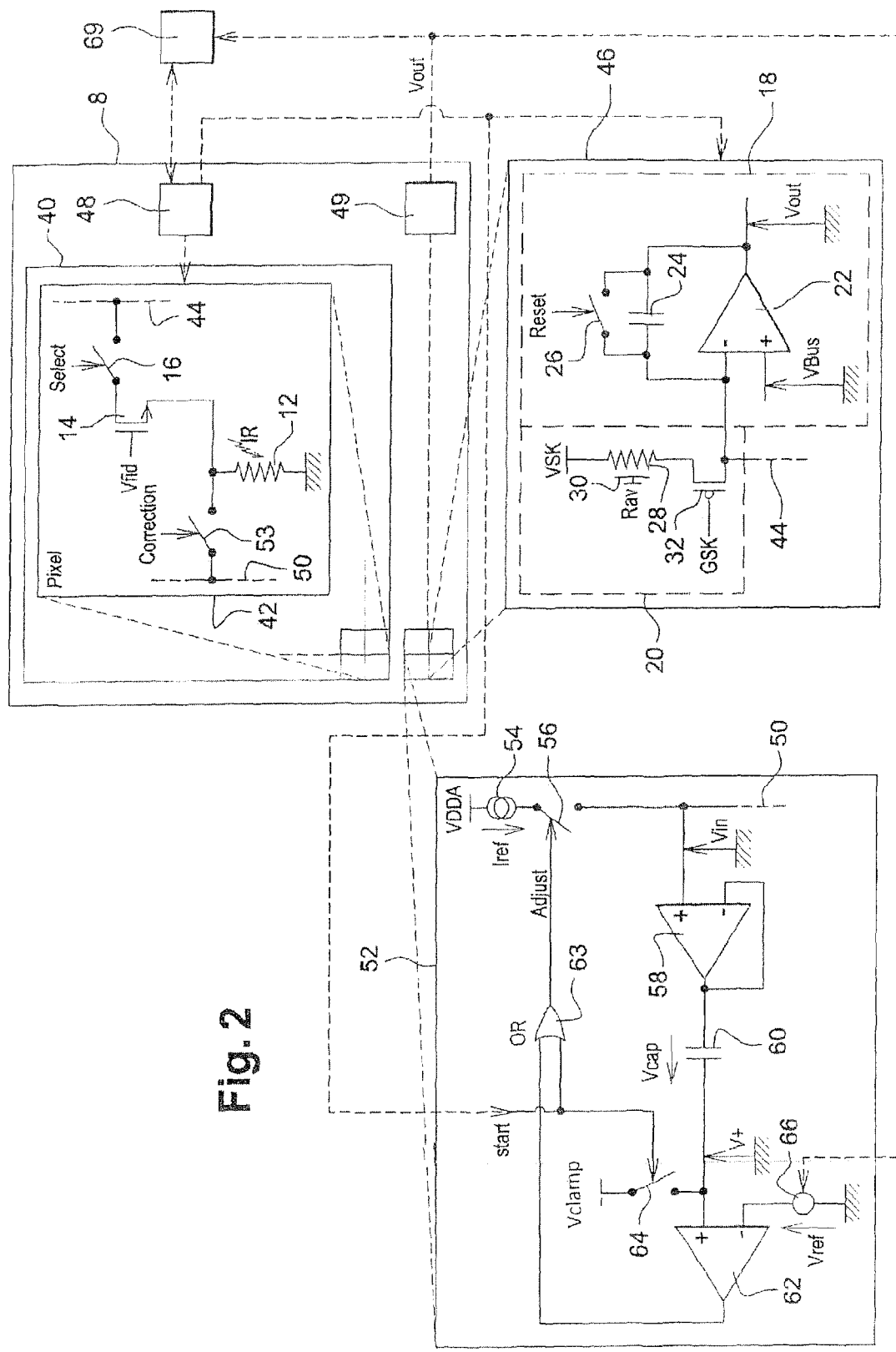
FIG. 2 is a schematic view of a first embodiment of a bolometric array detection device in accordance with the invention.

A bolometric detector according to the invention is shown schematically in FIG. 2. This detector comprises an array 40 of identical unitary detection elements 42, or "pixels", having N rows and M columns with each of the pixels comprising an imaging bolometer 12, a MOS transistor 14 and a read switch 16.

The imaging bolometers 12 all exhibit the same electrical resistance variation versus temperature, that is to say either an electrical resistance that increases when temperature increases or an electrical resistance that decreases when temperature increases. Moreover, for a given temperature, the imaging bolometers 12 have different electrical resistances, which results in offset variation of the output signal of the detector, also called "fixed spatial noise" or "offset variation", as detailed above. The spatial dispersion of the electrical resistances of the bolometers, which is measured with regard to a reference electrical resistance value, is called "offsets in resistance". Each bolometer thus exhibits an individual offset in resistance, which is usually different from the offsets in resistance of the other bolometers. The invention aims at cancelling the offset in resistance of each bolometer before the read-out thereof.

Each column of array 40 is associated, via a column read bus 44, with readout circuitry 46 which comprises an integrator 18, formed by an operational amplifier 22, capacitor 24 and zero reset switch 26, as well as a compensation circuit 20, formed by a resistive compensation bolometer 28 which is substantially insensitive to the radiation, for example by heat sinking to the substrate and/or by means of an opaque shield 30, and a MOS injection transistor 32.

Figure 1:
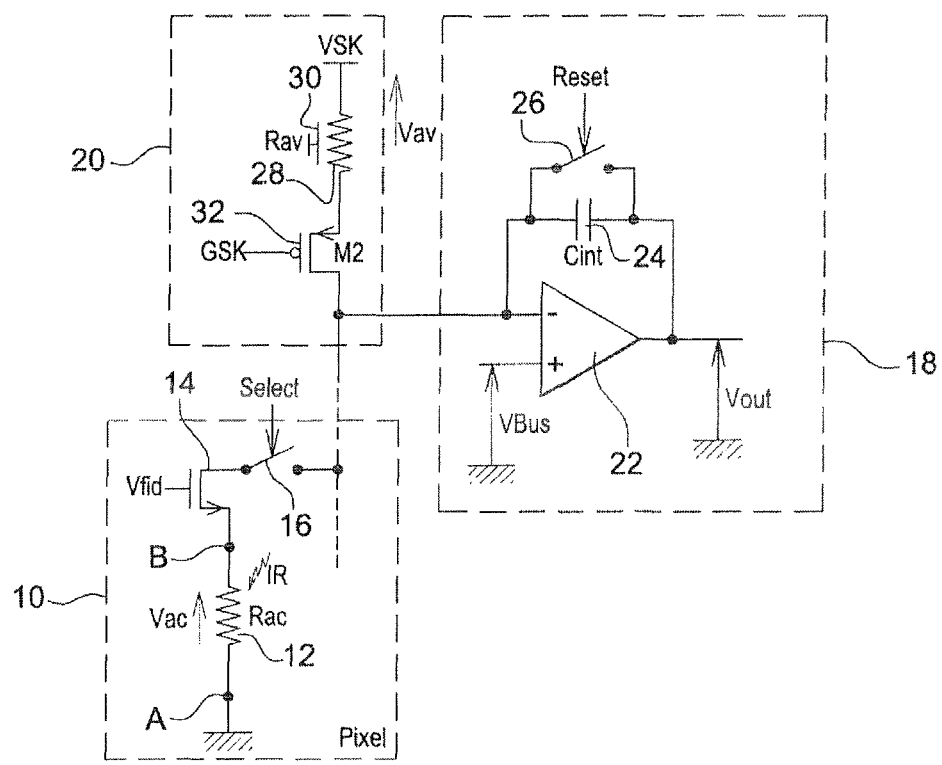
FIG. 1 is a schematic view of a basic detection and readout layout of the kind that is conventionally used in bolometric array detectors. This layout has already been described above.

Each pixel 42 of array 40 forms, together with its associated readout circuitry 46, a basic layout similar to that described in relation to FIG. 1. All the bolometric elements 12, 28 are formed on the surface of substrate 8 in which all the electronic elements are formed. The optically active area 40 is placed at the focus of appropriate optics (not shown).

As is known in itself, bolometers 12 of array 40 are read row by row, with the row of pixels that is currently being read being connected to readout circuitries 46 by closing read switches 16. As is usual in this process, after establishing voltages Vout on the output of integrators 18 at the end of reading a row, signals Vout are sampled and held before addressing the next row and then multiplexed to output amplifier 49; readout is usually clocked by a timer circuit 48 that is provided in substrate 8 and tasked with opening and closing read switches 16 and zero reset switches 26. The reader should refer, for instance, to the article mentioned above for more details of how readout operates.

According to the invention, each column of array 40 is also associated, via a column correction bus 50, with circuitry 52 for controlling the resistance of the bolometers in said column. The function of circuitry 52 is to correct the effect of the offset variability of bolometers 12 on the formed images as well as the effect of this variability on the detector's residual dynamic response. Connecting and disconnecting a pixel 42 in a column to its control circuitry 52 is ensured by a correction switch 53 located in pixel 42 between correction bus 50 and bolometer 12 and driven by timer circuitry 48 in a manner that is described in detail below.

According to a first embodiment, control circuitry 52 comprises:

- a current source 54 that outputs a constant predetermined current $I_{ref}$ and has one of its terminals connected to a constant voltage source VDDA, the current $I_{ref}$ being identical for all the control circuitries 52;
- a first controllable switch 56 connected between the other terminal of current source 54 and column correction bus 50;
- an operational amplifier 58 whose non-inverting input (+) is connected to column correction bus 50. The inverting input (−) of amplifier 58 is connected to the latter's output so that amplifier 58 thus operates as a voltage follower;
- a capacitor 60 that has one of its terminals connected to the output of amplifier 58;
- a comparator 62, the positive input (+) of which is connected to the other terminal of capacitor 60 and the output of which controls opening and closing of switch 56 through an OR logic gate 63;

a second switch 64 that can be controlled by means of a "Start" signal by timer circuitry 48; and a voltage source 66 connected to the negative input (−) of comparator 62 and producing, on the latter, an individual reference voltage $V_{ref}$ whose value depends on the imaging bolometer 12 of pixel 42 to which control circuitry 52 is connected.

As explained in detail later on, the voltage produced by voltage source 66 is programmable in order to allow adaptation to suit the pixel to which control circuitry 52 is connected. This voltage source comprises, for instance, a digital-to-analogue converter fed by a table of digital values stored in the detector.

Finally, the detector according to the invention comprises a correction management unit 69 that is typically (but not necessarily) not located on substrate 10. Management unit 69 stores, in particular, correction parameters for the resistances of imaging bolometers 12 and implements calibration of said parameters, as explained in greater detail below.

Unit 69 is, for instance, a digital processing unit as classically provided in detectors according to the prior art. The detectors are actually provided, firstly, with a digital output (analogue-to-digital conversion (ADC)) for signals Vout formed in substrate 8 next or behind amplifier 49 or remote in external electronic components and are, secondly, associated with a digital processing unit which comprises memories and correction algorithms, for example offset and gain algorithms for traditional "2-point corrections" that are needed for ordinary use of the detector. Said digital processing unit is deemed, hereinafter, to comprise, as is customary in this field, said means of storage and means of processing the digital data stated above in order to implement the invention.

Figure 3:
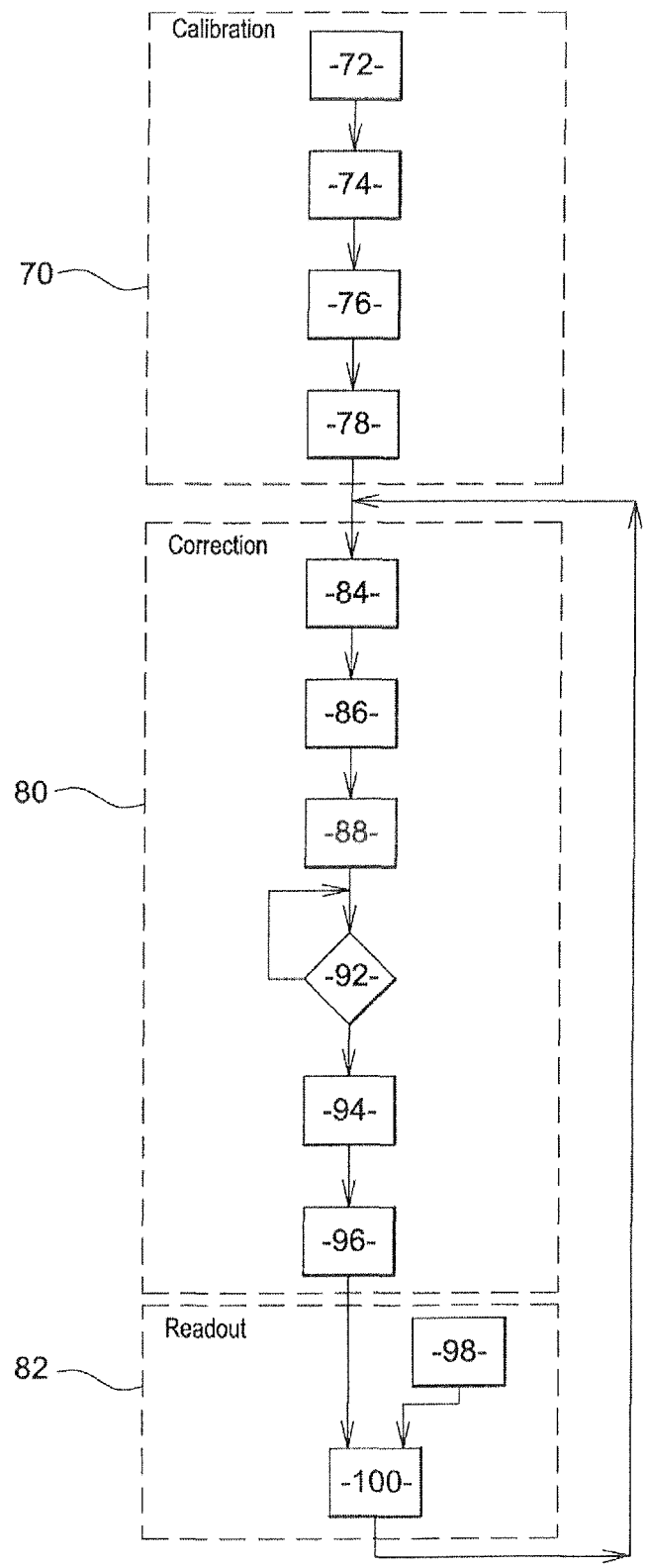
FIG. 3 is a flowchart showing a method for correcting variability in the offset of bolometers in accordance with the invention.

A method for correcting the effects of offsets as used by the detector described above is described below in relation to the flowchart shown in FIG. 3. This method is based on the rapid variation that the resistances of bolometers exhibit when a current flows through them (self-heating phenomenon due to the Joule effect). A current is thus injected into imaging bolometers 12 so as to individually correct their resistance before, and as close as possible to the integration phase. More particularly, according to the first embodiment of the invention, a single current $I_{ref}$ which is identical for all the bolometers 12, is injected into the bolometers 12, and the voltages across the bolometers 12 are free to change according to the current $I_{ref}$ flowing through them. The current injection in each bolometer is then stopped when the voltage across said bolometer is equal to an individual reference voltage $V_{ref}$ whose value depends on said bolometer.

The method that follows applies either to temperature-controlled bolometric detectors, e.g. bolometers maintained at constant temperature by Peltier effect modules (or thermoelectric coolers (TEC)), or to the so-called TEC-less detectors. e.g. detectors not provided with temperature stabilization means of the focal plane. The substrate, which comprises the read-out circuit, is therefore free to track more or less closely the variations of ambient temperature of the system, a camera for example, in which the detector is integrated.

More especially, and without this implying any limitative feature of the invention, the method applies to the imaging bolometers 12 whereof the bolometers 12, taking the form of membranes suspended above a substrate for example, are of the semiconductor type with their material that is sensitive to temperature variations being amorphous silicon (a-Si) or a vanadium oxide that is generically designated "VOx", this materials having their electrical behaviour which is essentially described by a roughly constant activation energy $E_A$.

These detectors have a negative resistance coefficient. i.e. their resistance diminishes as their temperature rises.

The method according to the invention starts with an offset calibration phase 70 that is performed, for instance, at the factory and/or on a regular basis in order to take into account the natural global drift, and/or the pixelwise drift, and/or the temperature drift of TEC-less detectors over the course of time.

This offset calibration phase 70 involves a first step 72 to expose the detector to a uniform scene for a given, for example constant, focal plane temperature TPF. To achieve this, the detector is placed, for instance, in front of a reference black body or, if applicable, the mechanical shutter of the detector is closed. Temperature TPF is the temperature to which the detector is adjusted when in use for temperature controlled detectors. It should also be noted that, since the substrate in which readout circuitry 46 and control circuitry 52 are formed and above which the bolometric membranes are formed is arranged in the focal plane of optics, this temperature will be referred to either as the temperature "of the focal plane" or the temperature "of the substrate".

Array 40 of bolometers 12 is then read, row by row, in step 74, with each row being successively connected to readout circuitries 46 located at the end of a column by closing read switches 16 which causes biasing of imaging bolometers 12. Connecting a row to circuitry 46 is preceded by discharging capacitors 24 by closing zero reset switches 26 and then opening them. In this step 74, transistors 32 of compensation circuitries 20 are forced to the off state so as to cancel out common-mode currents and imaging bolometers 12 are biased with a low voltage in order not to saturate capacitors 24 of integrators 18.

Once all the rows of the array of bolometers 12 have been read, one thus obtains in a table Vout of voltages Vout(i,j) that correspond to bolometers 12 of array 40 of the detector using the following tabular notation:

$$Vout = \begin{pmatrix} Vout(1,1) & Vout(1,2) & \ldots & Vout(1,M) \\ Vout(2,1) & Vout(2,2) & \ldots & Vout(2,M) \\ \vdots & \vdots & \ddots & \vdots \\ Vout(N,1) & Vout(N,2) & \ldots & Vout(N,M) \end{pmatrix}$$

Voltages Vout on the output of integrators 18 that result from integrating the currents that flow through imaging bolometers 12 are then analyzed by management unit 69 in order to determine the corresponding resistances of bolometers 12 of array 40 in a manner that is known in itself from the prior art.

On completion of readout step 74, one thus obtains, for focal plane temperature TPF, a table $R_{ac}$ of values of resistances $R_{ac}(i,j)$ that correspond to bolometers 12 of array 40 of the detector using the following tabular notation:

$$R_{ac} = \begin{pmatrix} R_{ac}(1,1) & R_{ac}(1,2) & \ldots & R_{ac}(1,M) \\ R_{ac}(2,1) & R_{ac}(2,2) & \ldots & R_{ac}(2,M) \\ \vdots & \vdots & \ddots & \vdots \\ R_{ac}(N,1) & R_{ac}(N,2) & \ldots & R_{ac}(N,M) \end{pmatrix} \quad (2)$$

This table is then stored in management unit 69.

Offset calibration phase 70 then continues by determining, by means of management unit 69, a resistance correction quantity for each of imaging bolometers 12 in step 76.

More especially, regarding bolometers having a negative coefficient in temperature, the smallest of the measured resistances $R^{min}{}_{ac}$ of table $R_{ac}$ is determined and a reference resistance $R_{min}$ that equals, or is preferably slightly less than, resistance $R^{min}{}_{ac}$ is determined. Resistance $R_{min}$ is the target resistance of the correction according to the invention to which the resistances of imaging bolometers 12 are adjusted before readout biasing in the special case where the detector is once more placed in the same uniform thermal illumination conditions as in calibration phase 70. In the general case of observing an arbitrary scene, the same individual resistance corrections will be applied using the same method. This results in elimination of spatial variations of resistances that are independent of the scene, as is also described in detail below.

One thus obtains, in step 76 a table of individual correction quantities $\Delta R_0(i,j)$ for the resistances of bolometers 12 in accordance with the following tabulated equation:

$$\Delta R_0 = \begin{pmatrix} \Delta R_0(1,1) & \Delta R_0(1,2) & \ldots & \Delta R_0(1,M) \\ \Delta R_0(2,1) & \Delta R_0(2,2) & \ldots & \Delta R_0(2,M) \\ \vdots & \vdots & \ddots & \vdots \\ \Delta R_0(N,1) & \Delta R_0(N,2) & \ldots & \Delta R_0(N,M) \end{pmatrix} \quad (3)$$

$$= \begin{pmatrix} R_{ac}(1,1)-R_{min} & R_{ac}(1,2)-R_{min} & \ldots & R_{ac}(1,M)-R_{min} \\ R_{ac}(2,1)-R_{min} & R_{ac}(2,2)-R_{min} & \ldots & R_{ac}(2,M)-R_{min} \\ \vdots & \vdots & \ddots & \vdots \\ R_{ac}(N,1)-R_{min} & R_{ac}(N,2)-R_{min} & \ldots & R_{ac}(N,M)-R_{min} \end{pmatrix}$$

Offset calibration phase 70 then completes by management unit 69 storing array $\Delta R_0$.

The quantities $\Delta R_0(i,j)$, which are the differences between the electrical resistances of the bolometers 12 and the common target value $R_{min}$, thus corresponds to the offsets in resistance of the bolometers 12 with regards to this common value at the moment of acquisition of the uniform scene and for a given temperature of the substrate.

As the common value $R_{min}$ is lesser or equal to each electrical resistance $R_{ac}(i,j)$, it is thus possible to adjust the electrical resistance $R_{ac}(i,j)$ of each bolometer to the common value $R_{min}$ by injecting an electrical current in said bolometer, which results in a decrease of the electrical resistance of said bolometer toward the common value. In other words, it is possible to apply an individual correction of the electrical resistance of each bolometer in order to drift the electrical resistance thereof by the corresponding individual correction quantity $\Delta R_0(i,j)$, which results in a final electrical resistance value $R_{min}$. The offset in resistance of the bolometer is thus cancelled.

Obviously, if the electrical resistances increase when the temperature increases, the common target value equals, or is larger than (preferably slightly larger), the largest electrical resistance $R_{ac}(i,j)$, in order to have a drift of the electrical resistance of each bolometer toward the common value when an electrical current is injected in said bolometer.

The following phases of the method are implemented when the detector is used by a user. The following explanations should be read in conjunction with FIGS. 4, 5A and 5B.

Figure 4:
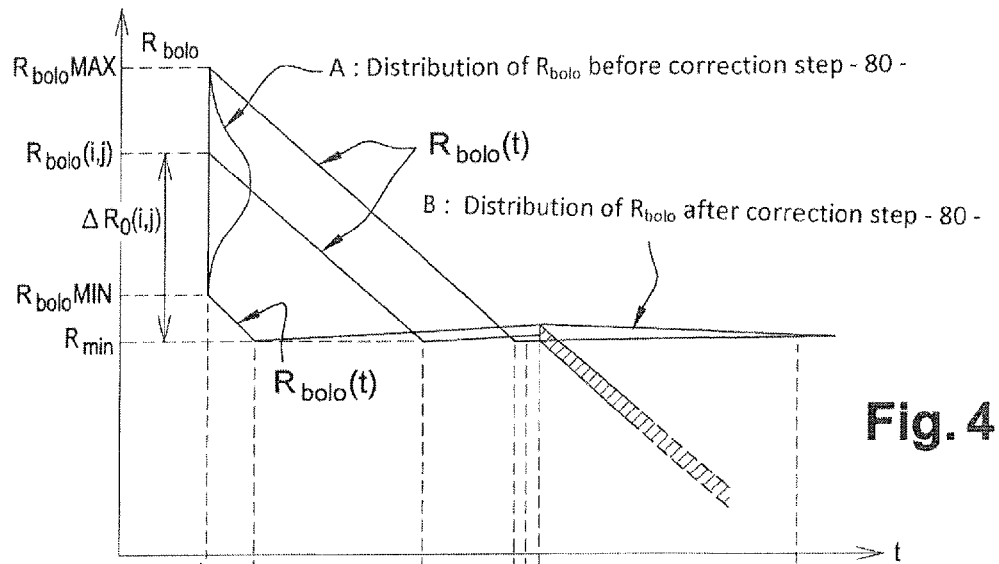
FIG. 4 is a diagram that explains changes in the resistances as a function of time subsequent to the invention being applied.

FIG. 4 illustrates changes in the resistances of a single row over time when the invention is implemented. For the sake of clarity, these changes correspond to exposing the detector to a uniform scene and it is assumed that the distribution of the resistances only includes contributions of a technological nature and the thermal distribution of the substrate, i.e. those equivalent to the conditions in offset calibration phase 70.

Figure 5A:
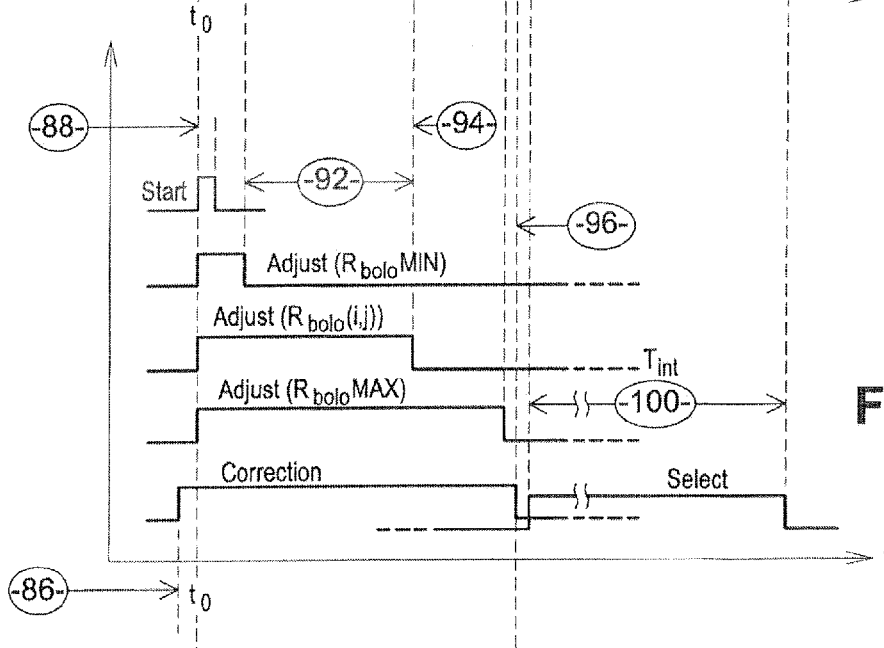
FIGS. 5A and 5B are timing diagrams for various signals used to control switches and that are produced when the method according to the invention is used.

Obviously, for ordinary use when exposed to an arbitrary scene which is the point of interest of the invention, what happens to the population of resistances will be commented on. FIG. 5A shows the control signals of the various switches that are produced when a first embodiment of the method according to the invention is used by the system in FIG. 2.

When the detector is used, a correction phase 80 for the resistances of the bolometers 12 in a row of array 40 is performed before and as close as possible in time to the readout phase 82 of said row.

More especially, the correction phase 80 of a row of array 40 starts in 84 by adjusting each of the individual voltages $V_{ref}$ of control circuitries 52. Voltage $V_{ref}$ of a circuitry 52 is then adjusted to an individual value relative to pixel 12 of the column associated with circuitry 52 as explained in more detail below.

Once voltages $V_{ref}$ have been adjusted to individual values, correction phase 80 continues, in 86, by closing the "Correction" switches 53 of the row of pixels with the selection switches 16 of the latter remaining opened. The pixels of the row being corrected are thus connected to their respective correction circuitry 52.

In next step 88, switches 56 that are connected to current sources 54 are then closed by a brief "Start" pulse provided by sequencer 48 through an OR gate, the role of which will be clarified further below, so that a constant current having the value $I_{ref}$ flows through bolometers 12 and the voltages across the bolometers 12 are free to change based on the current $I_{ref}$ flowing through them. The same current $I_{ref}$ thus flows in all the bolometers 12 of the row being corrected. Moreover, the array of bolometers being corrected on a row by row basis, the correction of the whole array thus implies the injection of a single constant current $I_{ref}$ in all of the bolometers of the array. In the text below, the closing of switches 56 marks the timeline "0" origin point.

Bearing in mind the fact that, given the nature of such an amplifier, operational amplifier 58 of circuitry 52 has a very high-impedance non-inverting input (+), all of the current $I_{ref}$ generated by current source 54 flows through bolometer 12 which is connected to that input. Voltage Vin on the non-inverting input (+) then assumes the following value at instant "0":

$$V\text{in}(0) = I_{ref} \cdot R_{bolo}(0) \quad (4)$$

where $R_{bolo}$ is the resistance of bolometer 12. The notation $R_{ac}$ is not used in this phase in order to differentiate the values of resistances during calibration ($R_{ac}$) from resistance values ($R_{bolo}$) when in use, these are generally different because they depend on the element of the scene observed by each sensitive pixel. For the sake of clarity, however, the notation $R_{bolo}$ is used in FIG. 4 in conformity with the situation when the detector is in use but the distribution of resistances is deliberately chosen to be identical to that produced by the calibration situation, in this particular case one has decided $R_{bolo} = R_{ac}$.

At the same time as closing switches 56 which connect current sources 54 to bolometers 12, switches 64 which are connected to capacitors 60 are also closed by the "Start" pulse and the effect of this is to bring, almost immediately, the (+) input of comparator 62 and the armature of capacitor 60 which is connected to it to potential Vclamp.

Because amplifier 58 of circuitry 52 is mounted as a voltage follower, the output voltage of the latter therefore equals voltage Vin on its non-inverting input (+). Thus, voltage Vcap across the terminals of capacitor 60 is forced, at instant "0", to the value Vcap in accordance with the following equation:

$$V\text{cap} = V\text{clamp} - V\text{in}(0) + V_{off} = V\text{clamp} - I\text{ref} \cdot R_{bolo}(0) + V_{off} \quad (5)$$

where $V_{off}$ is the so-called offset voltage between the two inputs of amplifier 58.

The duration of step 88 is sufficiently short, relative to the total duration of correction phase 80, to allow one to consider that, during step 88, resistance $R_{bolo}$ of bolometers 12 of the row that is currently being corrected changes little despite the Joule effect caused by biasing them. The duration of step 88 essentially depends on the value of the capacitance of capacitors 60 and the value of current $I_{ref}$ and is, by way of example, around 500 nanoseconds.

At the start of next step 90, the state of the switches 64 that are connected to capacitors 60 is changed to the open state when the "Start" pulse returns to its low level. Note that, at this stage, capacitors 60 do not discharge and keep the voltage difference Vcap constant across their terminals and these voltage differences will be preserved until the "Start" signal is subsequently activated because the branch connected to the positive input (+) of comparator 62 of circuitry 52 has a very high impedance.

This branch therefore floats and its voltage V assumes a value in accordance with the following equation:

$$V_+(t) = V\text{cap} + V\text{int}(t) + V_{off} = V\text{cap} + I\text{ref} \cdot R_{bolo}(t) + V_{off} \tag{6}$$

where t is the time counted down after instant "0".

Note that self-heating of a bolometer 12 (with a negative resistance coefficient) due to the Joule effect causes its resistance $R_{bolo}$ to drop. In fact, and as known in itself for semiconductors, the resistance $R_{bolo}$ of such a bolometer varies as a function of temperature in accordance with the equation:

$$R_{bolo} = R_{abs} \cdot \exp\left(\frac{E_A}{k \cdot T}\right) \tag{7}$$

where:
- $R_{abs}$ is an absolute asymptotic resistance of the bolometer at infinite temperature, the value of which depends on technological parameters;
- $E_A$ is the thermal conduction activation energy of the bolometric material;
- k is Boltzmann's constant; and
- T is the absolute temperature of the bolometer expressed in degrees Kelvin.

Thus, to the extent that the temperature T of the bolometer increases due to the Joule effect, its electrical resistance $R_{bolo}$ diminishes. FIG. 4 schematically shows this reduction as a linear, first-order approximation. Also note that if injected current $I_{ref}$ is comparable to the bias current used during integration, the slopes dR/dt of the two segments are comparable during the correction and integration phases, as shown in FIG. 4.

Voltage $V_+$ thus changes over time in accordance with the equation:

$$V_+(t) = V\text{cap} + I_{ref} \cdot R_{bolo}(t) + V_{off} = V\text{clamp} - I_{ref} \cdot (R_{bolo}(0) - R_{bolo}(t)) = V\text{clamp} - I_{ref} \cdot \Delta R_{bolo}(t) \tag{8}$$

Voltage $V_+$ therefore follows the variation $\Delta R_{bolo}(t)$ in the resistance of bolometer 12 due to the effect of its self-heating and therefore diminishes as a function of time.

As long as voltage $V_+$ on the positive input (+) of comparator 62 exceeds voltage $V_{ref}$ on its negative input (−), materialized by step 92, the "Adjust" signal that controls switch 56 which is connected to source 54 is held in a high state through OR gate 63. Switch 56 therefore remains closed and current $I_{ref}$ continues to flow through corresponding bolometer 12 and voltage $V_+$ continues to diminish.

When voltage $V_+$ reaches voltage $V_{ref}$ that is imposed on the negative input (−) of comparator 62, the latter's output changes to zero, in step 94, and this has the effect of opening switch 56 (OR gate 63 confirms the low state of the "Adjust" command because the "Start" signal is also in a low state) and hence stops the injection of current into bolometer 12. Switches 53 of pixels 42 of the row that is currently being corrected are then opened by the change of state of the "Correction" command that occurs in step 96.

According to the invention, voltage $V_{ref}$ of correction circuitry 52 is adjusted to a value in accordance with the following equation:

$$V_{ref} = V\text{clamp} - I_{ref} \cdot \Delta R_0(i,j) \tag{9}$$

corresponds to the individual value of array $\Delta R_0$ relative to bolometer 12 of the pixel 42 to which circuitry 52 is connected.

Thus, when the switch 56 changes to its open state and to the extent that, at this instant, the condition $V_+ = V_{ref}$ is met, the resistance of the bolometer has undergone a variation $\Delta R$ equal to $\Delta R_0(i,j)$.

FIG. 4 shows, in particular, changes over time in the highest resistance ($R_{bolo}$MAX), the lowest resistance ($R_{bolo}$MIN) and any intermediate resistance ($R_{bolo}(i,j)$) of a single row i that is in the process of being corrected. Current injection stops (the resistance no longer diminishes) in each resistance at instants that are defined by the respective values $\Delta R_0(i,j)$ in accordance with the stated principle. The "Correction" signal controlled, preferably in an adjustable manner by sequencer 48 is held in a high state for a duration that is sufficient for the highest resistance (equals $R_{bolo}$MAX at the zero instant) to have time to vary by the highest quantity $\Delta R_0$ in table $\Delta R_0(i,j)$. In the particular case chosen for the sake of clarity when explaining FIG. 4 which reproduces the thermal conditions of the calibration phase, all the resistances finish changing in step 94 at value $R_{min}$.

The method then continues with readout phase 82 during which zero reset switches 26 of readout circuitries 46 are closed and then reopened in 98 (not shown in FIG. 5A because this operation runs in parallel with step 80) in order to discharge capacitors 24 of integrators 18, then the read switches 16 of pixels 12 of the row that is currently being read are closed in step 100 by activating the "Select" command in order to connect the pixels 12 of the row to circuitries 46 for a duration that defines the predetermined integration time $T_{int}$ as explained above.

During the time period between step 94 and step 100, which is variable depending on the bolometer in question, the latter's temperature tends to return to its equilibrium value at a rate that is limited by the thermal time constant of the bolometers; this results in slight restoration of the natural variations in resistance, typically accompanied by inversion of the distribution order, as indicated in FIG. 4, without this having any insurmountable adverse effect, given the very small time periods in question (several microseconds).

Step 82 of the method then loops to step 84 in order to correct the resistances and read the bolometers of the next row i+1 of array 40. At the same time, between the start of step 88 and the start of step 100 for row i+1, a sample and hold operation (not shown in FIG. 5A) is performed on voltages Vout of row i. Multiplexing of the stream of signals to output amplifier 49 may, if necessary, extend into the integration phase for row i−1, as is known in itself.

FIG. 4 shows the attraction of setting value $R_{min}$ below the set of values $R_{ac}(i,j)$. Adopting this procedure, the values of all the resistances are modified before the start of the integration step by injecting current $I_{ref}$. If value $R_{min}$ is set too high, some of the bolometers will actually not be affected by the resistance adjustment and this would produce image distortion due to a local correction defect. On the other hand, if this value is set significantly below the minimum distribution value, this will necessitate a pointlessly long duration in order to obtain standardization of all the resistances and this would have nothing but disadvantages. The time periods that are not specified in FIG. 4 are defined on the basis of nominal signal settling criteria, as is customary in the profession, without any other particular constraints.

Before the bolometers are read, their resistances are therefore corrected by a predetermined quantity. By way of a numerical example, a resistance correction typically takes 4 to 8 microseconds in order to apply a resistance offset of 2% due to the Joule effect. More generally, the time during which current $I_{ref}$ is applied is several microseconds; this time is short compared with the usual integration times $T_{int}$ which last several dozen microseconds or the duration of a read frame which usually equals 16 ms. Note also that it is possible to shorten the duration of correction by applying a higher current $I_{ref}$ without having to modify the circuits or operation described above.

As indicated. FIG. 4 shows the population of resistances of imaging bolometers 12 of array 40 before they are corrected (histogram "A") and after correction (histogram "B") in a case where the thermal conditions are representative of the calibration phase. Note that the variability of the resistances of bolometers 12 is substantially reduced before they are read, by correction in accordance with the invention. Thus, the effect of offset variability on formed images is substantially lessened and the residual dynamic response is substantially increased.

In the general case of use when exposed to an arbitrary scene, the distribution of the resistances is defined by the radiant flux absorbed by each bolometer 12. As a result, histogram "A" before correction step 80 will typically have a different shape and, above all, be wider. Nevertheless, correction step 80, applied as described above, results in a histogram "B" corrected to take into account the incidence of so-called natural variations of resistances because each of these resistances $R_{bolo}(i,j)$ will have had, in step 94, its value reduced by quantity $\Delta R_0(i,j)$ which is representative of its individual offset under the reference conditions. The final values are no longer uniformly $R_{min}$ but a value that is ideally representative only of the scene.

What is more, in most cases, the width of this histogram "B" before integration step 100 is less than that of uncorrected histogram "A" (by the width of the amplitude of the corrections) and this results in appreciable gain in the dynamic scene response of the detector.

In other words, it should be noted that shifting the resistances of bolometers 12 towards a lower resistance does not destroy, in any way whatsoever, the thermal information obtained from the scene contained in the value of the resistances of bolometers 12. In fact, correcting the resistances of bolometers 12 involves simply shifting the resistances on the basis of quantities that are not dependent on the value of the resistances at the instant the correction is applied. Because of this, the distribution of the resistances associated with the thermal distribution of the scene is still present in the resistances after the correction phase.

This correction is therefore similar to a "1-point" type offset correction as described above, i.e. comparable to closing a mechanical shutter followed by associated corrections and at the continuous level of voltages Vout on the output of integrators 18. However, in contrast to this type of correction performed using electronics and/or an algorithm not located in the readout circuit, correction according to the invention does not impose any limitation in terms of dynamic response to the signal on the detector's output. On the contrary, by reducing the variability of the resistances and thus the variability of bias currents $I_{ac}$ that flow through bolometers 12 when they are read, it is possible to improve the residual dynamic response and/or increase the bias voltage of bolometers 12, as the user chooses.

Figure 6:
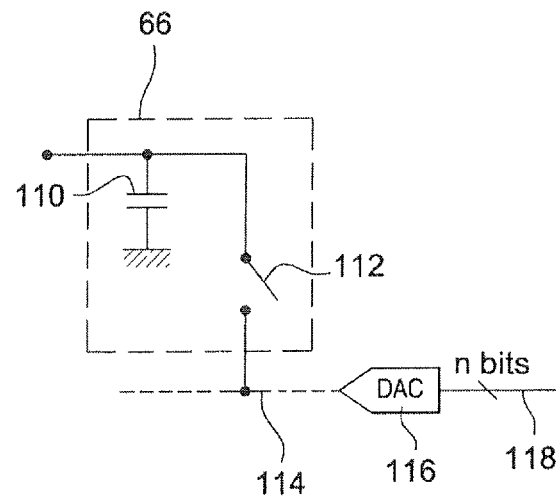
FIG. 6 is a schematic view of a first embodiment of a source of individual reference voltage $V_{ref}$ which forms part of the bolometric detection device according to the invention.
Figure 7:
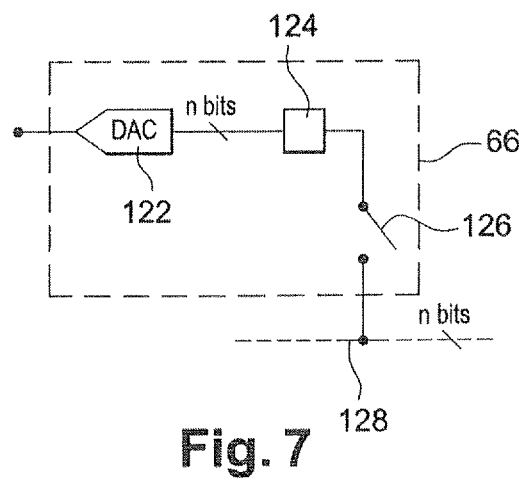
FIG. 7 is a schematic view of a second embodiment of a source of individual reference voltage $V_{ref}$ in accordance with the invention.

Note also that, as a direct consequence of correction according to the invention, a large proportion of sensitivity variations are eliminated without there being any need to apply additional computing or processing. Sensitivity is actually inversely proportional to the value of each resistance. FIGS. 6 and 7 show examples of embodiments of programmable voltage source 66.

The first example, shown in FIG. 6, is based on analogue multiplexing. Voltage source 66 comprises a capacitor 110 that is connected between the negative terminal of comparator 62 of control circuitry 52 and ground and a controllable switch 112 that is connected between said negative input and an analogue multiplexing bus 114. This bus 114 is itself connected to a digital-to-analogue converter 116 which receives, on its input, a digital value, e.g. in n bits, of voltage $V_{ref}$ that needs to be produced by voltage source 66. This digital voltage value is supplied by associated management unit 69 to the detector and sent over bus 114 in serial mode during step 84, as detailed below.

In order to produce a particular analogue voltage $V_{ref}$ the digital value that corresponds to this voltage is initially converted into analogue voltage $V_{ref}$ on bus 114 by means of converter 116. Switch 112 is then closed and capacitor 110 charges to voltage $V_{ref}$. Once charging is finished, switch 112 is opened, leaving bus 114 and converter 116 free to be used in order to adjust voltage $V_{ref}$ of another control circuitry 52. Once all the voltages $V_{ref}$ of the row of circuits 52 have charged, said voltages are ready to be used in accordance with the invention and the process restarts by charging the voltages $V_{ref}$ that relate to the next row.

Analogue multiplexing can be used to implement the invention despite temporal changes to pre-charged voltages $V_{ref}$ due to slight leakage currents because the useful time for which these voltages are maintained corresponds roughly to 1 row time, i.e. several dozen microseconds.

The second example of an embodiment of voltage source 66, shown in FIG. 7, is based on digital multiplexing. Voltage source 66 comprises a digital-to-analogue converter 122 whose output is connected to the negative input of comparator 62 of control circuitry 52, an n-bit digital register whose output is connected to the input of converter 122, and a controllable switch 126 which is connected between the input of register 124 and an n-bit digital multiplexing bus 128.

In order for source 66 to produce a particular analogue voltage $V_{ref}$, a digital value for this voltage is initially produced on bus 128 by management unit 69 which is associated with the detector and then switch 126 is closed. The digital value on bus 128 is then stored in register 124 and converted by converter 22 into voltage $V_{ref}$. Once storage in register 124 is finished, switch 126 is opened, leaving bus 128 free to be used in order to adjust voltage $V_{ref}$ of another control circuitry 52. Once all the registers 124 of the row of circuits 52 have been programmed, said circuits are ready to be used in accordance with the invention and the process restarts by loading the digital data that relates to producing voltages $V_{ref}$ and that is required in order to read the next row.

Also note that, as evidenced in FIG. 4, the time needed to obtain correction of the resistances of all the bolometers 12 of a row of array 42 depends on the correction quantities $\Delta R_0(i,$ j). Since values $\Delta R_0(i,j)$ are not equal, the correction time therefore varies from one bolometer to another. Also, the bolometers in a row are necessarily read synchronously. Consequently, the duration of correction phase 80 must be chosen so that all the corrections of the resistances of the bolometers in a single row are effective and that the read phase 82 of this row starts without waiting unduly after the end of correction phase 80. Actually, it is convenient for read phase 82 and, more especially, the latter's integration phase to be performed as close as possible to correction of the resistances so as to avoid any restoral of the variability of the resistances of the bolometers which is distinctive of the detector's thermal equilibrium. Such restoral is, in fact, produced by a natural relaxation effect linked to the thermal time constant of the bolometers, as already stated and shown in FIG. 4.

Generally speaking, there may therefore be a slight time lag between the end of a particular correction of a bolometer 12, the duration of which is less than that of correction phase 82, and the start of integration phase 100 which is performed on that bolometer. This time lag is, however, not critical as long as it remains far less than the time of the read frames (usually 16 ms) and the thermal time constant of the bolometers which is classically 5 ms to 15 ms.

In addition, the system described above can be modified in accordance with a second embodiment which differs from the embodiment described in relation to FIG. 2 in terms of the current sources of control circuitries 52 which output individual currents $I_{ref}$ depending on the corrections that are to be made in order to obtain an equal correction duration $\Delta t$ for all the bolometers. Like the first embodiment, the voltages across the bolometers 12 are free to change based on the individual currents flowing in the bolometers.

According to this embodiment, a table of currents $I_{ref}(i,j)$ is calculated on the basis of the table of corrections $\Delta R_0(i,j)$, for example in accordance with the equation proposed below, and module 52 is reduced to current generator 54 which is associated with means of programming current $I_{ref}$ and has the layout shown in FIG. 8 for instance. The functional timing diagram shown in FIG. 5A boils down to the "Correction" signal which is changed to a high state on duration $\Delta t$. This embodiment does not require any switches 56 because the uniform time $\Delta t$ for which current $I_{ref}(i,j)$ is applied can be defined directly by the state of switch 53 which is controlled by sequencer 48.

In this case, the correction phase 80 for a row i of array 50 starts in 84 by individually digitally programming the currents that are to be produced by each of the generators 54 of circuitries 52. Correction phase 80 continues in 86 which corresponds to closing the switches 53 of the row of pixels with the selection switches 16 of the latter remaining opened. This phase finishes in 96 by opening switches 53 (the "Correction" command returns to a low state) after a predetermined duration $\Delta t$. The rest of the process is identical to that described earlier.

Figure 8:
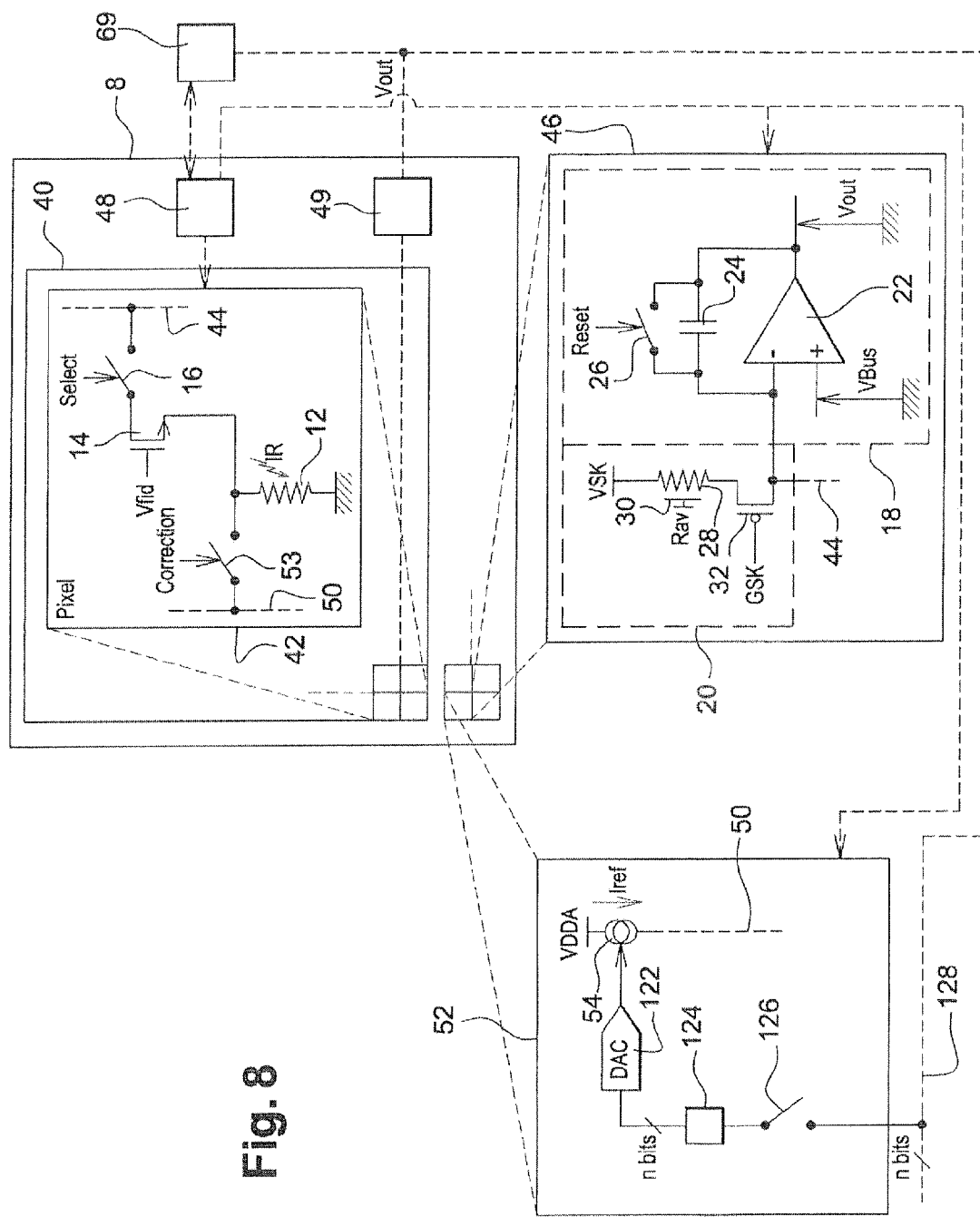
FIG. 8 is a schematic view of a second embodiment of a bolometric array detection device in accordance with the invention which uses a source of individual reference current $I_{ref}$.

Loading the current values is typically realized digitally by using multiplexing similar to that described in relation to FIG. 7 and shown schematically in FIG. 8. In this case, the DAC controls one current generator per column with the value of the currents output by generators 54 of each column being updated one row at a time.

Figure 9A:
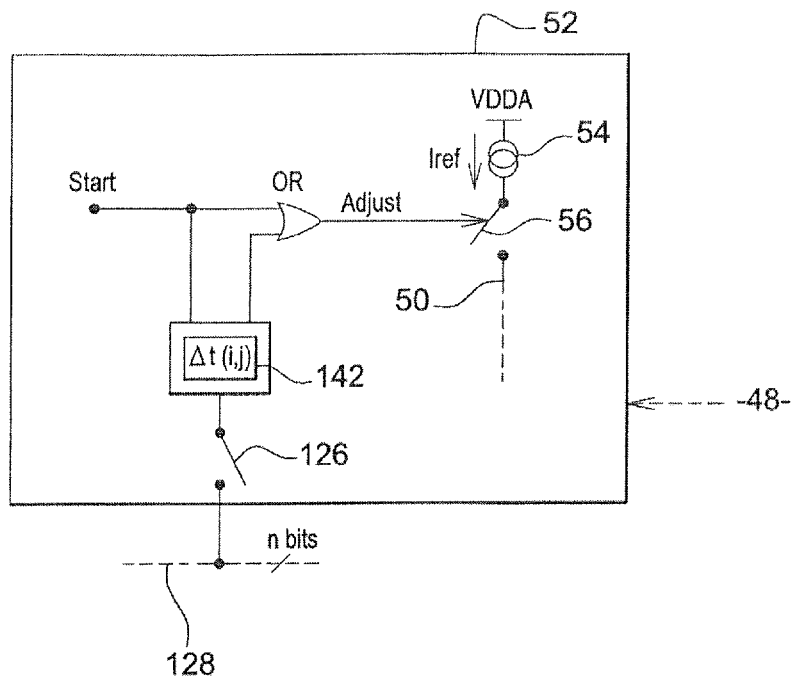
FIG. 9A is a schematic view of devices for time-based control that are part of a third embodiment of a bolometric detection device in accordance with the invention.

A third embodiment is described below. This embodiment differs from the embodiment in FIG. 2 by virtue of the control circuits for the resistances 52 of bolometers 12, as illustrated in FIG. 9A. According to the third embodiment of the invention, a single current $I_{ref}$ which is identical for all the bolometers 12, is injected into the bolometers 12, and the voltages across the bolometers 12 are free to change according to the current $I_{ref}$ flowing through them. The current injection in each bolometer is then stopped after an individual duration that depends on said bolometer.

In this embodiment, a control circuit 52 comprises, like a control circuit 52 in the first embodiment, a current source 54 capable of outputting a current having a constant (that is to say spatially uniform along a row and sequentially identical from row to row) value $I_{ref}$ and connected to column bus 50 via a switch 56 that is controlled by an OR logic gate, one input of which is controlled by a "Start" command. The other input follows the output of an interval timer 142. The value of individual duration $\Delta t(i,j)$ is pre-programmed in n bits in timer 142 as a function of the (i,j)th pixel 12 to which control circuit 52 is connected. Timer countdown is triggered by the "Start" command on timer 142 which confirms the high state of the "Adjust" signal via the OR gate when the "Start" pulse changes back to the low state. The timing diagram for the digital signals in FIG. 5A applies at every point.

From the first derivative versus temperature of relation (7), the relative variation of resistance $\Delta R_{ac}/R_{ac}$ of a semiconductor bolometer with resistance $R_{ac}$ induced by a variation $\Delta T$ of its temperature around the absolute temperature TPF can be expressed at first order by the relation:

$$\frac{\Delta R_{ac}}{R_{ac}} = -\left(\frac{E_A}{k \cdot TPF^2}\right)\Delta T \tag{10}$$

where the term $(-E_A/k \cdot TPF^2)$ is commonly referred to as the TCR (temperature coefficient of resistance) of the sensitive material from which the bolometer is made of.

According to the fact that the invention is designed to compensate for a very small relative deviation between the extreme values of table $R_{ac}$, generally around 2%, it follows that Joule heating by only 1° K the more resistive bolometer of an array with a TCR of –2%/K would tweak its resistance to a value around the target lowest resistance $R_{min}$. Thus, the approximation (10) is fully valid in the considered domain of variation.

Considering that the duration $\Delta t$ of the Joule dissipation under current $I_{ref}$ is far shorter than the thermal relaxation time of the bolometer, the temperature rise $\Delta T$ of the bolometer can be very closely approximated by:

$$\Delta T = \frac{R_{ac} \cdot I_{ref}^2}{C_{th}} \cdot \Delta t \tag{11}$$

where $C_{th}$ is the heat capacity of the bolometer.

Combining (10) and (11) results in the relation giving the duration $\Delta t$ to be applied to the bolometer under biasing current $I_{ref}$ in order to obtain any small variation $\Delta R$ of its resistance, where $\Delta R$ is taken as the modulus of this variation:

$$\Delta t = \frac{k \cdot TPF^2 \cdot C_{th}}{E_A \cdot R_{ac}^2 \cdot I_{Ref}^2} \cdot \Delta R$$

Particularly, the temperature-rise durations $\Delta t(i,j)$ that are to be applied to bolometers 12 in order to obtain resistance corrections $\Delta R_0(i,j)$ are given in accordance with the equation:

$$\Delta t(i, j) = \frac{k \cdot TPF^2 \cdot C_{th}}{E_A \cdot R_{ac}^2 \cdot I_{Ref}^2} \cdot \Delta R_0(i, j) \quad (12)$$

since the quantities $\Delta R_0$ are known through the application of the calibration phase according to the invention. The parameter $R_{ac}$ would rigorously be expressed according to its tabulated known value $R_{ac}(i,j)$, however a generally sufficient approximation is given by an average and unique value noted $R_{ac}$ in relation (12), since using the tabulated value would generate only a second order correction of durations $\Delta t(i,j)$.

Note that the substrate temperature TPF is used there in place of the temperature of the bolometer itself, which rises somewhat under Joule effect. However as already said, the very limited rise of temperature after correction of the resistances does not depart significantly the TCR from its value at starting of heating, so there is no need to consider more refined estimation of the durations $\Delta t(i,j)$. The other constant parameters appearing in relation (12) are given by the general knowledge of the manufacturer, or the proportionality factor $$K = \frac{k \cdot TPF^2 \cdot C_{th}}{E_A \cdot R_{ac}^2 \cdot I_{Ref}^2}$$

can be directly calibrated as a whole in factory for temperature stabilized detectors.

Thus, according to the third embodiment of the invention, a table $\Delta t$ is calculated and stored in the memory of the management unit 69, which contains the individual temperature-rise durations $\Delta t(i,j)$ that are to be applied in order to produce the individual $\Delta R_0(i,j)$ quantities. The correction phase for a row of array 40 of pixels 12 thus involves loading the corresponding $\Delta t(i,j)$ duration values in interval timers 142, closing switches 56 (switches 16 remain open and switch 53 is closed) and then opening each of them after an individually customized duration. The resistance of each of bolometers 12 of a row is thus corrected by their corresponding quantity $\Delta R_0(i,j)$.

According to a fourth embodiment, it may be advantageous to bias the bolometers under a spatially uniform and constant voltage $V_{pol}$ between its terminals during individually pre-calculated time intervals $\Delta t(i,j)$, the currents in the bolometers being free to change based on the resistance variation induced by the Joule effect. This embodiment differs from the embodiment in FIG. 2 by virtue of the control circuits for the resistances 52 of bolometers 12.

Figure 9B:
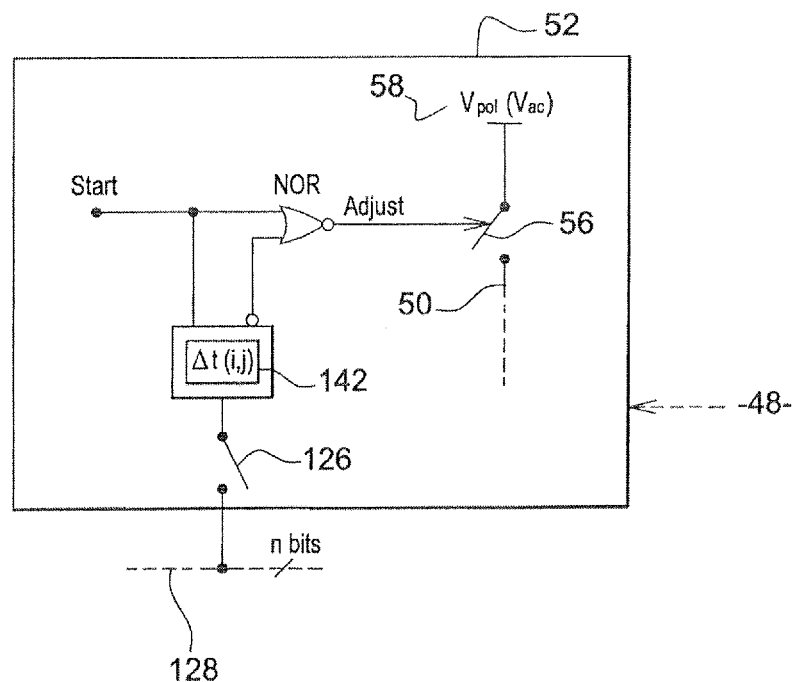
FIGS. 9B and 9C are schematic views of devices for time-based control that are part of a fourth embodiment of a bolometric detection device in accordance with the invention.

For doing so, as shown on FIG. 9B, any constant (that is to say spatially uniform along the row being corrected and sequentially identical from row to row) voltage $V_{pol}$ 58 able to heat up the more resistive bolometer so as to produce the highest resistance variation $\Delta R_0$ MAX during a line period might be used. This insures that all bolometers of the ith line would be properly tweaked in resistance within the time the (i−1)th line is being read.

Advantageously, the reduced voltage that was selected for biasing the bolometers during the calibration phase 70 may be selected for this particular implementation. Moreover, it makes sense switching pixels 12 to this alternate biasing branch under bias 58 through the activation (closing) of switches 53 while in calibration phase 70 for $R_{as}(i,j)$ measurement. This gives some latitude at end of column to refine the quality of $R_{ac}(i,j)$ measurement out of the constraints of MOS 14 in terms at least of dimensions, noise, offset variations, and unusual low inversion biasing.

Figure 9C:
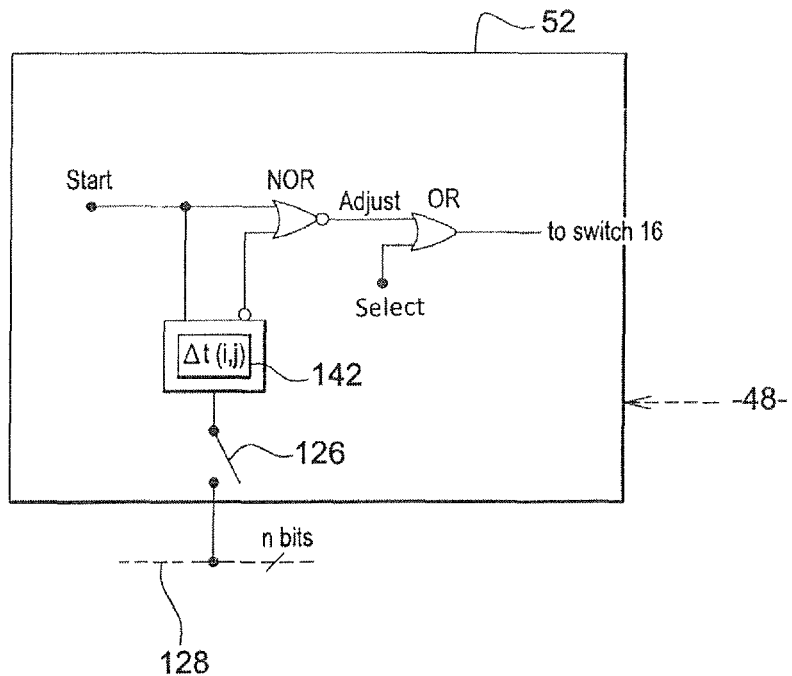

It may be preferred conversely to use the same bias $V_{ac}$ that is applied during the integration phase, since this allows a simplification of the circuit according for example to FIG. 9C. There is no need for switches 53, 54, and no need either for generator 56 (or bias source 58) or bus 50. The signal "Adjust" issued by the NOR gate is combined with the "Select" command at the inputs of an additional OR gate. The output of said OR gate replaces the former "Select" signal activating the simultaneous row connection between MOS 14 and bolometer 12.

According to this particular implementation, the bolometer 12 is biased under the same constant voltage $V_{ac}$ as exerted during the integration period $T_{int}$, by the same transistor 14. This transistor is connected to the bolometer during an individually customized period $\Delta t(i,j)$ controlled by the timer 142. The command "Select", if activated slightly before the common end of the correction phase according to the preferred timing diagram 51 (step 96), would maintain a seamless biasing between the resistance adjustment period ("Adjust" signal at high state) and the integration period. The integration starts when the switch 26 opens after the reset closing pulse on its gate, while the "Select" command is already on. This simplified 9C design may be preferred when the line period is not constrained by the operating frame rate, since pre-adjusting and integration phases should be performed as a chained block line after line, unless for example a duplication of the column amplifiers is provided along with an alternate column connection toward the first and second ones. For small N*M format detectors anyway, this limitation is not an issue.

The temperature rise of the bolometer under constant voltage V ($V_{ac}$ or $V_{pol}$ according to the different options) can be expressed as:

$$\Delta T = \frac{V^2}{C_{th} \cdot R_{ac}} \cdot \Delta t$$

In a similar way as derived for relation (12), one obtain similar relation giving the durations $\Delta t(i,j)$ that are to be applied to the bolometers 12 in order to obtain resistance corrections $\Delta R_0(i,j)$:

$$\Delta t(i, j) = \frac{k \cdot TPF^2 \cdot C_{th}}{E_A \cdot V^2} \cdot \Delta R_0(i, j) \quad (13)$$

The different relation forms of the third and fourth embodiments may thus be expressed according to the common form:

$$\Delta t(i,j) = K \cdot \Delta R_0(i,j)$$

where the integrated proportionality parameter K is a constant for a given temperature, for instance for stabilized detectors, to be adjusted for example in factory and kept in memory by the management unit 69.

It is now proposed an empirical method of direct determination of the K factor under constant $I_{ref}$ or constant $V_{ref}$ biasing, without any knowledge of the imbedded constants appearing in relations (12) or (13).

For doing so, the calibration phase 70 is completed by an additional "try and repeat" loop, while keeping the detector facing the uniform scene, and keeping, if required, the reduced biasing conditions needed for non-saturating the integrator 18 during the $R_{ac}(i,j)$ measurement phase. More particularly, the "try and repeat" loop is run after the table $\Delta R_0$ table has been established, and determines the optimal value $K_{opt}$ of the K factor such that:

$$K_{opt} = \underset{K \geq 0}{\operatorname{argmin}}(C(Vout(K \times \Delta t)))$$

where C is a positive criterion of the table Vout of voltages Vout(i,j) that decreases when span of table Vout decreases, the value of the voltage table Vout depending on the individual duration $\Delta t(i,j)$ stored in a table $\Delta t = K \cdot \Delta R_0$ For instance, the criterion (C is equal or proportional to amplitude of the table Vout according to the relation:

$$C(Vout) = \max_{i,j}(Vout(i,j)) - \min_{i,j}(Vout(i,j))$$

For instance, the criterion C is equal or proportional to the variance of the table Vout according to the relations:

$$C(Vout) = \sqrt{\left(\frac{1}{N \times M} \sum_{i,j}(Vout(i,j) - \overline{V}out)^2\right)}$$

$$\overline{V}out = \frac{1}{N \times M} \sum_{i,j} Vout(i,j)$$

In practice, a value $\Delta t$ for the table $\Delta t = K \cdot \Delta R_0$ is computed based on the offset in resistance table $\Delta R_0$ and an initial value $K_{ini}$ of the factor K, for instance a standard value given by the manufacturer or a formerly used value of K stored in the detector, for example in the management unit 69. Then, an integration and computation cycle is run, said cycle consisting in:
- injecting current in the bolometers according the computed table duration $\Delta t$ (either under constant current operation or constant voltage operation, depending whether the factor K is determined for the third or fourth embodiments respectively) under the recalled specific non saturating biasing conditions;
- obtaining a corresponding table Vout of voltages; and
- computing the value of the criterion C(Vout) for the table Vout.

This initial K factor is then changed to a different incremental or calculated value, and a new table $\Delta t$ for the new value of K is computed, and the integration and computation cycle for the new table $\Delta t$ is run once more. This loop (modification of factor K and integration and computation cycle) is repeated until the criterion C(Vout) reaches its minimum.

The "best" algorithm for efficiently scanning the K factor toward its optimal value $K_{opt}$ (ideally zeroing the Vout span) is easy to implement and thus not necessary to detail in depth. The best K value corresponding to minimum Vout span is then stored for resistance corrections according to the invention until a new calibration phase 70 if any is to be run. This algorithmic empirical method may be repeated each time the resistance offset calibration phase 70 is started for offset resistance correction updating.

Nevertheless, the first embodiment described in relation to FIG. 2 is preferred insofar as durations $\Delta t(i,j)$, regardless whether they are calculated in accordance with equation (12) or (13), depend on the value $C_{th}$. Using a single value of $C_{th}$ for all bolometers 12 is an approximation that may lead to measurement inaccuracy insofar as this parameter of bolometers exhibits natural technological variability. What is more, using a single value TPF for the temperature of the focal plane is equivalent to assuming that the substrate has a spatially uniform temperature; this is not always the case and is therefore also a source of inaccuracy unless it is taken into account by the correction unit when calculating the times $\Delta t(i,j)$ for the spatial temperature distribution of the focal plane with the aid of several sensors that are in contact with or embedded in substrate 10.

According a fifth and sixth embodiments, the third and fourth embodiments are respectively associated with operation whereby step 94 which corresponds to the end of current injection is simultaneous for all circuits 52. Such operation is obtained by closing switch 56 of each circuit 52 after a wait time that corresponds to the additional time $\Delta t(i,j)$ relative to time $\Delta t(i,j)$MAX which corresponds to the bolometer that is initially the most resistive in table $\Delta t_0$.

Figure 5B:
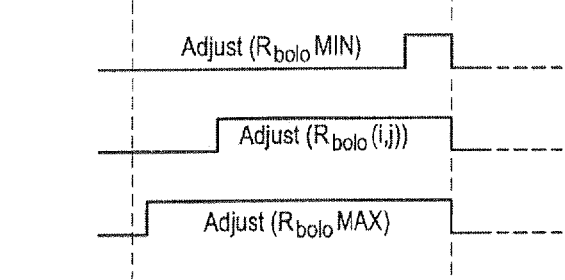
Figure 9D:
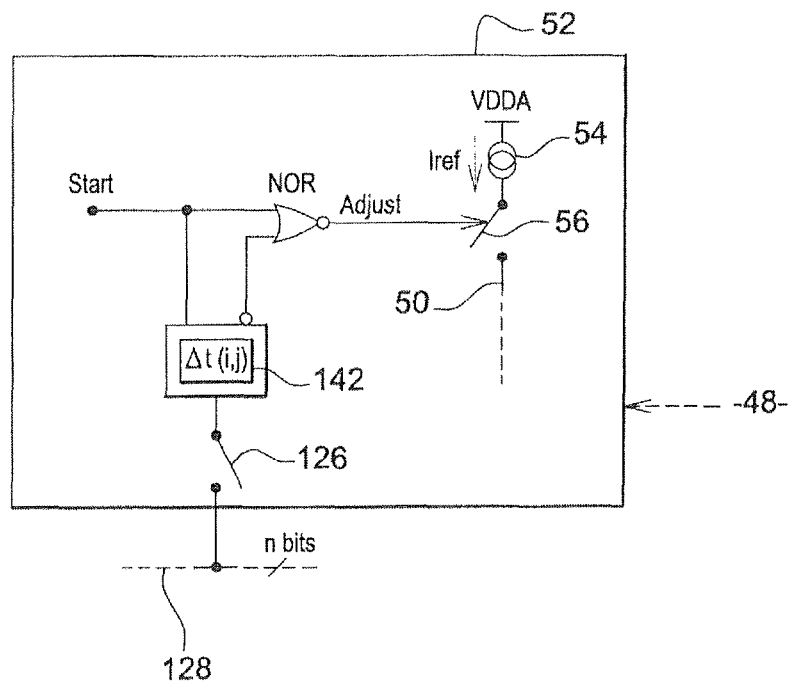
FIG. 9D is a schematic view of devices for time-based control that are part of a fifth and sixth embodiments of a bolometric detection device in accordance with the invention.

FIG. 9D shows a version of control circuit 52 which produces this result, in relation to the timing diagram in FIG. 5B. In FIG. 5B, only the "Adjust($R_{bolo}$ MIN)". "Adjust($R_{bolo}$ MAX)" and "Adjust($R_{bolo}$(i,j))" signals are shown, the "Start", "Correction" and "Select" signals being identical to those in FIG. 5A.

In FIG. 9B, the OR gate used in FIG. 9A is replaced by a NOR gate and the output polarity of timer 142 is reversed. In addition, table $\Delta t_0$ which is used to preload timers 142 is replaced by additional table $C\Delta t_0$ in which each element equals $[\Delta t(i,j)MAX - \Delta t(i,j)]$. As before, the "Start" signal initiates countdown of the individual times for each timer 142 which closes associated switch 56 when the additional time $C\Delta t(i,j)$ has elapsed. Opening switch 53 ("Correction" signal in low state) marks the end of current injection and of correction step 80 for all the bolometers in a single row i at the same instant.

Thus, all the bolometers have the same time to return to thermal equilibrium before the start of phase 100 and this time is advantageously adjustable to a very small value. Usual clock frequencies of around 10 MHz allow a unitary time increment of around 50 to 100 ns which is easily precise enough to implement the invention according to this third embodiment effectively.

The fifth and sixth embodiments will therefore typically only be preferred, to the extent that the circuit is simpler compared with that in FIG. 2 given as an example of realization according to the first embodiment, if the technological variability of parameter $C_{th}$ can be considered to produce negligible variability of output signals Vout with regard to the effect of other variations that are independent of the scene.

As stated above, variation in resistance before integration may, according to the second embodiment mentioned earlier, be imposed by means of a current $I_{ref}$ that is applied for a uniform duration $\Delta t$. It is easy to extract the current $I_{ref}$ from equation (12) as a function of the other parameters and then indexing in terms of individual values $I_{ref}(i,j)$:

$$I_{ref}(i,j) = \left(\frac{k \cdot TPF^2 \cdot C_{th}}{E_A \cdot R_{ac}(i,j) \cdot \Delta t} \cdot \Delta R_0(i,j)\right)^{1/2} \quad (14)$$

where like in the other embodiments, $R_{ac}(i,j)$ might be replaced by an average unique value $R_{ac}$ for simplification. This expression allows numerical estimation of each current $I_{ref}(i,j)$ of the second embodiment that is to be applied for the chosen duration $\Delta t$. This implementation of the invention has the advantage of simultaneously setting all the resistances of bolometers 12 to values, before integration, that are devoid of variations that are independent of the scene on the row that is currently being processed at an instant that is preferably very close to the start of the integration phase. There is then essentially no-time for variations associated with thermal relaxation towards equilibrium.

In the case of this embodiment, curves $R_{bolo}(t)$ in a diagram such as that in FIG. 4 show a series of segments having different slopes which converge at a single point having the value $R_{min}$ at the end of duration $\Delta t$. Duration $\Delta t$ is adjustable thanks to the associated setting of currents $I_{ref}(i,j)$ to a value that is, firstly, appropriate to the desired correction accuracy and, secondly, does not extend the row time. e.g. below the time required for the sample and hold phase that precedes and follows each row integration phase.

The embodiments described above apply to bolometers made of a bolometric material whose resistance diminishes as its temperature rises. i.e. a bolometric material that has a negative resistance coefficient, such as a semiconductor material consisting of amorphous silicon (a-Si) or vanadium oxide (VOx).

But the invention also applies to bolometric materials that have a positive resistance coefficient. i.e. materials whose resistance increases as their temperature rises, such as metals, especially titanium.

In this application, correction in accordance with invention involves increasing the resistance of each bolometer rather than reducing it as described above so as to obtain a distribution that is substantially concentrated around resistance $R_{max}$ of table $R_{ac}$ of resistances obtained during the calibration phase.

Embodiments of the invention that apply to temperature-controlled bolometric detectors are also described above.

But the invention also applies to detectors that are not temperature controlled and more commonly referred to as "TEC-less".

In a first version of such an application, the correction quantities (i,j) are adjusted at the beginning of the correction phase as a function of the temperature of the focal plane, measured by a sensor (gauge) located on the substrate. e.g. a semiconductor sensor formed directly in the readout circuitry. For example, during the detector calibration phase, a plurality of correction tables $\Delta R_0$, having a respective duration table $\Delta t_0$, are acquired as a function of several focal plane temperatures TPF and stored in the detector. When the detector is used, one particular table among these stored tables is selected or interpolated as a function of the measured temperature $TPF_{mes}$ of the focal plane. This design requires several reference tables, and this can be a time-consuming and therefore expensive process. However, it is particularly adapted to detectors which bolometric material is not, or not enough precisely described by standard semiconductors electrical laws like recalled by the relation (7), for example metals.

In one preferred version, particularly adapted to semiconductor bolometric materials, a single reference table $R_{ac0}$ is acquired during the detector's calibration phase, while the detector is at a reference temperature $TPF_0$. The single reference table $R_{ac0}$ is acquired for a uniform scene at a known substrate temperature $TPF_0$, for example from an extended black body, a shutter or a uniform portion of the sky. Because there is a known model for variation of the resistance of bolometers as a function of temperature, e.g. equation (7), a table of currently estimated resistances $R_{ac}$ is calculated regularly and/or periodically when using the detector as a function of the measured temperature TPF of the focal plane and of reference table $R_{ac0}$. Using equation (7), the individual values $R_{ac}(i,j)$ are then calculated in accordance with the equation:

$$R_{ac}(i,j) = R_{ac0}(i,j) \cdot \exp\left((E_A/k) \cdot \left(\frac{1}{TPF} - \frac{1}{TPF_0}\right)\right) \quad (15)$$

Once table $R_{ac}$ has been calculated, the correction table $\Delta R_0$ is updated, then the corresponding voltages $V_{ref}(i,j)$, or currents $I_{ref}(i,j)$, or corresponding temperature-rise durations $\Delta t(i,j)$, are calculated as described above.

Using a model of the resistance of the bolometers as a function of temperature thus makes it possible to avoid having to acquire a plurality of resistance tables.

Moreover, in order to improve correction accuracy in accordance with the invention further still by reducing the variability of the corrected resistances, the spatial variation of the temperature of the focal plane can also be taken into account by using several temperature sensors located on the focal plane. Spatial modelling of the focal plane temperature is then used as a function of the temperature measurements in order to determine the temperature of the substrate at the level of each imaging bolometer. The quantity needed to correct the resistance of a bolometer is then calculated as a function of the corresponding temperature of the substrate.

The invention claimed is:

1. A method for detecting infrared radiation by using an array of bolometers, the bolometers having electrical resistances that vary in the same direction as a function of the temperature, and the bolometers having respective offsets in resistance $\Delta R_0(i,j)$, this method consisting of the following steps in order to read a bolometer of the array of bolometers:
   biasing the bolometer at a predetermined voltage in order to make current flow through the bolometer;
   subtracting a common-mode current from the current that flows through the bolometers; and
   producing a voltage by integrating the difference between the current that flows through the bolometers and the common-mode current,
   wherein the method comprises determining the offsets in resistance $\Delta R_0(i,j)$ of the bolometers with regard to a common value $R_{min}$, wherein said common value $R_{min}$ is greater or equal to the largest resistances of the bolometers when said direction is an increase or said common value $R_{min}$ is lesser or equal to the smallest resistances of the bolometers when said direction is a decrease, and
   wherein the method involves, prior to reading a bolometer, individually correcting the resistance of said bolometer by injecting therein an electrical current so as to shift the resistance of said bolometer by the offset in resistance $\Delta R_0(i,j)$ determined for said bolometer, thereby adjusting the resistance of said bolometer to the common value $R_{min}$.

2. The method as claimed in claim 1, wherein the offsets in resistance $\Delta R_0(i,j)$ of the bolometers are determined by:
   exposing the array of bolometers to a uniform scene;
   determining the corresponding resistances of the bolometers; and
   subtracting the following from said resistances:
   a quantity substantially equal to the smallest of the determined resistances when said direction is a decrease; or
   subtracting, from said resistances, a quantity substantially equal to the largest of the determined resistances when said direction is an increase.

3. The method as claimed in claim 1, wherein the current injection in said bolometer consists in:
injecting a predetermined single constant current $I_{ref}$ in said bolometer, said current being the same for all the bolometers;
stopping current injection in said bolometer after an individual duration $\Delta t(i,j)$ depending on the offset in resistance $\Delta R_0(i,j)$ of said bolometer.

4. The method as claimed in claim 2, wherein injecting the electrical current in said bolometer is stopped after an individual duration depending on the offset in resistance $\Delta R_0(i,j)$ of said bolometer, and the individual duration $\Delta t(i,j)$ equals a value according to the equation:

$$\Delta t(i, j) = \frac{k \cdot TPF^2 \cdot C_{th}}{E_A \cdot (R_{ac}(i, j) \cdot I_{ref})^2} \cdot \Delta R_0(i, j)$$

where $\Delta R_0(i,j)$ is the offset in resistance of said bolometer, k is Boltzmann's constant, TPF is the temperature of the substrate, $C_{th}$ is the heat capacity of the bolometer, $E_A$ is the thermal conduction activation energy of the bolometric material of which the bolometer is made, and $R_{ac}(i,j)$ is the resistance of said bolometer determined after having exposed the array to the uniform scene.

5. The method as claimed in claim 2, wherein injecting the electrical current in said bolometer is stopped after an individual duration depending on the offset in resistance $\Delta R_0(i,j)$ of said bolometer, and the individual duration $\Delta t(i,j)$ equals a value according to the equation:

$$\Delta t(i,j) = K \cdot \Delta R_0(i,j)$$

wherein K is a factor minimizing the span of voltages produced by the reading of the imagining bolometers, and
wherein the method consists in determining said factor K being by a try and repeat loop.

6. The method as claimed in claim 1, wherein the current injection in said bolometer consists in:
applying a predetermined single constant voltage V across the terminals of said bolometer, said voltage being the same for all the bolometers;
stopping current injection in said bolometer after an individual duration $\Delta t(i,j)$ depending on the offset in resistance $\Delta R_0(i,j)$ of said bolometer.

7. The method as claimed in claim 2, wherein injecting the electrical current in said bolometer is stopped after an individual duration depending on the offset in resistance $\Delta R_0(i,j)$ of said bolometer, and the individual duration $\Delta t(i,j)$ equals a value according to the equation:

$$\Delta t(i, j) = \frac{k \cdot TPF^2 \cdot C_{th}}{E_A \cdot V^2} \cdot \Delta R_0(i, j)$$

where $\Delta R_0(i,j)$ is the offset in resistance of said bolometer, k is Boltzmann's constant, TPF is the temperature of the substrate, $C_{th}$ is the heat capacity of the bolometer, and $E_A$ is the thermal conduction activation energy of the bolometric material of which the bolometer is made.

8. The method as claimed in claim 2, wherein injecting the electrical current in said bolometer is stopped after an individual duration depending on the offset in resistance $\Delta R_0(i,j)$ of said bolometer, and the individual duration $\Delta t(i,j)$ equals a value according to the equation:

$$\Delta t(i,j) = K \cdot \Delta R_0(i,j)$$

wherein K is a factor minimizing span of voltages produced by the reading of the imagining bolometers, and
wherein the method consists in determining said factor K being by a try and repeat loop.

9. The method according claim 1, wherein the current injection in said bolometer consists in:
injecting a predetermined single constant current $I_{ref}$ in said bolometer, said current being the same for all the bolometers,
comparing the voltage across the terminals of said bolometer with a predetermined individual voltage that depends on the offset in resistance $\Delta R_0(i,j)$ of said bolometer, and
stopping the current injection in said bolometer when the voltage across the terminals of said bolometer equals the predetermined individual voltage.

10. The method according to claim 1, wherein the current injection in said bolometers consists in:
applying a predetermined single constant voltage V across the terminals of said bolometer, said voltage being the same for all the bolometers;
injecting an individual current into said bolometer during a single period of time $\Delta t$, the individual current having a value that depends on the bolometer's offset in resistance $\Delta R_0(i,j)$, and the single period of time $\Delta t$ being the same for all the bolometers.

11. The method as claimed in claim 2, wherein the current injection in said bolometer includes injecting an individual current into said bolometer depending on the bolometer's offset in resistance $\Delta R_0(i,j)$, and the individual current equals a value according the following equation:

$$I_{ref}(i, j) = \left( \frac{k \cdot TPF^2 \cdot C_{th}}{E_A \cdot R_{ac}(i, j) \cdot \Delta t} \cdot \Delta R_0(i, j) \right)^{1/2}$$

where $I_{ref}(i,j)$ is the value of the current, $\Delta R_0(i,j)$ is the offset in resistance of said bolometer, k is Boltzmann's constant, TPF is the temperature of the substrate, $C_{th}$ is the heat capacity of the bolometer, $E_A$ is the thermal conduction activation energy of the bolometric material of which the bolometer is made, and $R_{ac}(i,j)$ the resistance of said bolometer determined after having exposed the array to the uniformed scene.

12. The method according as claimed in claim 1, wherein the method comprises the application of simultaneous individual corrections for a row of bolometers of the array of bolometers, and wherein the current injection into the bolometers of the row is temporarily deferred so as to terminate said current injection substantially simultaneously.

13. The method as claimed in claim 3, wherein the individual duration $\Delta t(i,j)$ equals a value according to the equation:

$$\Delta t(i, j) = \frac{k \cdot TPF^2 \cdot C_{th}}{E_A \cdot (R_{ac}(i, j) \cdot I_{ref})^2} \cdot \Delta R_0(i, j)$$

where $\Delta R_0(i,j)$ is the offset in resistance of said bolometer, k is Boltzmann's constant, TPF is the temperature of the substrate, $C_{th}$ is the heat capacity of the bolometer, $E_A$ is the thermal conduction activation energy of the bolometric material of which the bolometer is made, and $R_{ac}$ (i,j) is the resistance of said bolometer determined after having exposed the array to the uniform scene.

14. The method as claimed in claim 3, wherein the individual duration Δt(i,j) equals a value according to the equation:

$$\Delta t(i,j) = K \cdot \Delta R_0(i,j)$$

wherein K is a factor minimizing the span of voltages produced by the reading of the imagining bolometers, and wherein the method consists in determining said factor K being by a try and repeat loop.

15. The method as claimed in claim 6, wherein the individual duration Δt(i,j) equals a value according to the equation:

$$\Delta t(i, j) = \frac{k \cdot TPF^2 \cdot C_{th}}{E_A \cdot V^2} \cdot \Delta R_0(i, j)$$

where $\Delta R_0(i,j)$ is the offset in resistance of said bolometer, k is Boltzmann's constant, TPF is the temperature of the substrate, $C_{th}$ is the heat capacity of the bolometer, and $E_A$ is the thermal conduction activation energy of the bolometric material of which the bolometer is made.

16. The method as claimed in claim 6, wherein the individual duration Δt(i,j) equals a value according to the equation:

$$\Delta t(i,j) = K \cdot \Delta R_0(i,j)$$

wherein K is a factor minimizing span of voltages produced by the reading of the imagining bolometers, and wherein the method consists in determining said factor K being by a try and repeat loop.

17. The method as claimed in claim 10, wherein the individual current equals a value according the following equation:

$$I_{ref}(i, j) = \left( \frac{k \cdot TPF^2 \cdot C_{th}}{E_A \cdot R_{ac}(i, j) \cdot \Delta t} \cdot \Delta R_0(i, j) \right)^{1/2}$$

where $I_{ref}(i,j)$ is the value of the current, $\Delta R_0(i,j)$ is the offset in resistance of said bolometer, k is Boltzmann's constant, TPF is the temperature of the substrate, $C_{th}$ is the heat capacity of the bolometer, $E_A$ is the thermal conduction activation energy of the bolometric material of which the bolometer is made, and $R_{ac}(i,j)$ the resistance of said bolometer determined after having exposed the array to the uniformed scene.

* * * * *